United States Patent
Dutta

(10) Patent No.: US 11,258,823 B2
(45) Date of Patent: Feb. 22, 2022

(54) MULTILAYER TUNNELING OF PROTOCOLS OVER QUIC

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/911,980

(22) Filed: Jun. 25, 2020

(65) Prior Publication Data

US 2021/0409447 A1 Dec. 30, 2021

(51) Int. Cl.
| | |
|---|---|
| H04L 29/06 | (2006.01) |
| H04L 29/08 | (2006.01) |
| H04L 69/16 | (2022.01) |
| H04L 67/02 | (2022.01) |
| H04L 67/01 | (2022.01) |

(52) U.S. Cl.
CPC ........ *H04L 63/166* (2013.01); *H04L 63/0428* (2013.01); *H04L 67/02* (2013.01); *H04L 67/42* (2013.01); *H04L 69/16* (2013.01)

(58) Field of Classification Search
CPC ... H04L 63/0428; H04L 63/166; H04L 67/02; H04L 67/42; H04L 69/16
See application file for complete search history.

(56) References Cited

U.S. PATENT DOCUMENTS

| | | | |
|---|---|---|---|
| 2004/0037320 A1* | 2/2004 | Dickson | H04L 29/06027 370/473 |
| 2018/0007172 A1 | 1/2018 | Wang et al. | |
| 2020/0099766 A1* | 3/2020 | Fromentoux | H04L 67/2842 |

OTHER PUBLICATIONS

Gagliardi, Eva & Levillain, Olivier. Analysis of QUIC Session Establishment and Its Implementations. Information Security Theory and Practice, pp. 169-184. Springer International Publishing. (Mar. 2, 2020).*
Kumar, Puneet & Dezfouli, Behnam. Implementation and Analysis of QUIC for MQTT. Internet of Things Research Lab, Department of Computer Engineering, Santa Clara University, USA. pp. 29-45. (Year: 2018).*

(Continued)

*Primary Examiner* — John M Macilwinen
(74) *Attorney, Agent, or Firm* — Tong, Rea, Bentley & Kim, LLC

(57) ABSTRACT

A client and a server negotiate a version of a protocol that supports multiplexed connections using a connectionless transport layer protocol, such as a QUIC protocol that is supported for a connection between the client and the server. The connection can support one or more streams. The client embeds a first extension in a cryptographic handshake. The first extension includes a structure that indicates a set of protocols supported by the client at a set of layers. The client and the server then concurrently negotiate a subset of the protocols and a subset of the layers that are supported by the client and the server. Data is tunneled from the subset of the protocols and the subset of the layers over the connection between the client and the server. The data is tunneled using stream frames that include the data, a first field having a value indicating a layer type, and a second field having a value indicating a protocol type.

19 Claims, 17 Drawing Sheets

(56) References Cited

OTHER PUBLICATIONS

M. Luglio, M. Quadrini, C. Roseti, F. Zampognaro and S. P. Romano, "A QUIC-based proxy architecture for an efficient hybrid backhaul transport," 2020 23rd Conference on Innovation in Clouds, Internet and Networks and Workshops (ICIN), Paris, France, 2020, pp. 144-146, (Feb. 2020).*

Nottingham et. al. RFC 7838. HTTP Alternative Services, pp. 1-20. (Year: 2016).*

Quentin De Coninck and Olivier Bonaventure. Multipath QUIC: Design and Evaluation. In Proceedings of the 13th International Conference on emerging Networking EXperiments and Technologies (CoNEXT '17). Association for Computing Machinery, New York, NY, USA, 160-166. (Year: 2017).*

Kenneth L. McMillan and Lenore D. Zuck. Formal specification and testing of QUIC. In Proceedings of the ACM Special Interest Group on Data Communication (SIGCOMM '19). Association for Computing Machinery, New York, NY, USA, 227-240. (Year: 2019).*

Dai et al., "Using NETCONF Over QUIC Connection", Internet-Draft, Network Working Group, Apr. 28, 2020, 13 pages.

Friedl et al., "Transport Layer Security (TLS) Application-Layer Protocol Negotiation Extension", Internet Engineering Task Force (IETF), RFC 7301, Jul. 2014, 9 pages.

Iyengar, et al., "QUIC: A UDP-Based Multiplexed and Secure Transport", Internet-Draft, Feb. 21, 2020,174 pages.

Thomson, et al., "Using TLS to Secure QUIC", Internet-Draft, Feb. 21, 2020, 52 pages.

Piraux, et al., "Tunneling Internet Protocols Inside QUIC", Internet-Draft, QUIC Working Group, Mar. 9, 2020, 15 pages.

Piraux, et al., "Tunneling TCP Inside QUIC", Internet-Draft, QUIC Working Group, Mar. 9, 2020, 12 pages.

European Search Report mailed in corresponding EP 21180938.9 dated Nov. 19, 2021, 9 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                       Common Header(*)                      ...
+-+-+-+-+-+-+-+-+-+-+-+-+-+-+-+-+-+-+-+-+-+-+-+-+-+-+-+-+-+-+-+-+
|                          Frame 1 (*)                        ...
+-+-+-+-+-+-+-+-+-+-+-+-+-+-+-+-+-+-+-+-+-+-+-+-+-+-+-+-+-+-+-+-+
|                          Frame 1 (*)                        ...
+-+-+-+-+-+-+-+-+-+-+-+-+-+-+-+-+-+-+-+-+-+-+-+-+-+-+-+-+-+-+-+-+
|                          Frame 2 (*)                        ...
+-+-+-+-+-+-+-+-+-+-+-+-+-+-+-+-+-+-+-+-+-+-+-+-+-+-+-+-+-+-+-+-+
                                ...
+-+-+-+-+-+-+-+-+-+-+-+-+-+-+-+-+-+-+-+-+-+-+-+-+-+-+-+-+-+-+-+-+
|                          Frame N (*)                        ...
+-+-+-+-+-+-+-+-+-+-+-+-+-+-+-+-+-+-+-+-+-+-+-+-+-+-+-+-+-+-+-+-+
```

FIG. 4

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+
|1|1|T T|X X X X|
+-+-+-+-+-+-+-+-+-+-+-+-+-+-+-+-+-+-+-+-+-+-+-+-+-+-+-+-+-+-+-+-+
|                         Version (32)                          |
+-+-+-+-+-+-+-+-+-+-+-+-+-+-+-+-+-+-+-+-+-+-+-+-+-+-+-+-+-+-+-+-+
| DCID Len (8)  |
+-+-+-+-+-+-+-+-+-+-+-+-+-+-+-+-+-+-+-+-+-+-+-+-+-+-+-+-+-+-+-+-+
|                  Destination Connection ID (0..160)         ...
+-+-+-+-+-+-+-+-+-+-+-+-+-+-+-+-+-+-+-+-+-+-+-+-+-+-+-+-+-+-+-+-+
| SCID Len (8)  |
+-+-+-+-+-+-+-+-+-+-+-+-+-+-+-+-+-+-+-+-+-+-+-+-+-+-+-+-+-+-+-+-+
|                    Source Connection ID (0..160)            ...
+-+-+-+-+-+-+-+-+-+-+-+-+-+-+-+-+-+-+-+-+-+-+-+-+-+-+-+-+-+-+-+-+
```

FIG. 5

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type (0x20)   | Flags | Layer |         Protocol ID           |
+-+-+-+-+-+-+-+-+-+-+-+-+-+-+-+-+-+-+-+-+-+-+-+-+-+-+-+-+-+-+-+-+
|                       Stream ID (i)                         ...
+-+-+-+-+-+-+-+-+-+-+-+-+-+-+-+-+-+-+-+-+-+-+-+-+-+-+-+-+-+-+-+-+
|                       [Offset (i)]                          ...
+-+-+-+-+-+-+-+-+-+-+-+-+-+-+-+-+-+-+-+-+-+-+-+-+-+-+-+-+-+-+-+-+
|                       [Length (i)]                          ...
+-+-+-+-+-+-+-+-+-+-+-+-+-+-+-+-+-+-+-+-+-+-+-+-+-+-+-+-+-+-+-+-+
|                       Stream Data (*)                       ...
+-+-+-+-+-+-+-+-+-+-+-+-+-+-+-+-+-+-+-+-+-+-+-+-+-+-+-+-+-+-+-+-+
```

FIG. 14

MULTILAYER TUNNELING OF PROTOCOLS OVER QUIC

BACKGROUND

Packets are transmitted over a network according to a protocol. For example, the hypertext transfer protocol (HTTP, HTTP/2, HTTP/3) is an application layer request-response protocol that uses a client-server computing model in which clients submit an HTTP request to the server, which provides resources such as HTML files or performs functions on behalf of the client and then returns a response message to the client. Application layer protocols such as HTTP are built over transport layer protocols, such as the transmission control protocol (TCP), to provide reliable, in order, and error-checked delivery of a byte stream between hosts connected by the network. The application layer protocol (e.g., HTTP) hands data to the transport layer protocol (e.g., TCP) and the transport layer protocol attempts to deliver the data to its destination in the exact same form over a connection between the client and server. For example, the TCP protocol breaks up data into network packets (called segments) and adds a header including control information such as a sequence number that is used to detect packets that are lost are transmitted out of order and a checksum that permits detection of errors within the packets. The TCP protocol implements automatic repeat request (ARQ) to allow the receiver to request retransmission of packets that are lost or damaged. The TCP protocol is connection-oriented so that a connection must be established between a client and a server before data is sent between the client and the server.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 4 illustrates a format of a QUIC packet according to some embodiments.

FIG. 5 illustrates a format of a long header for a QUIC packet according to some embodiments.

FIG. 14 illustrates a generic stream frame that is used to transport data from any protocol in a tunnel over a QUIC connection according to some embodiments.

DETAILED DESCRIPTION

Figure 1:
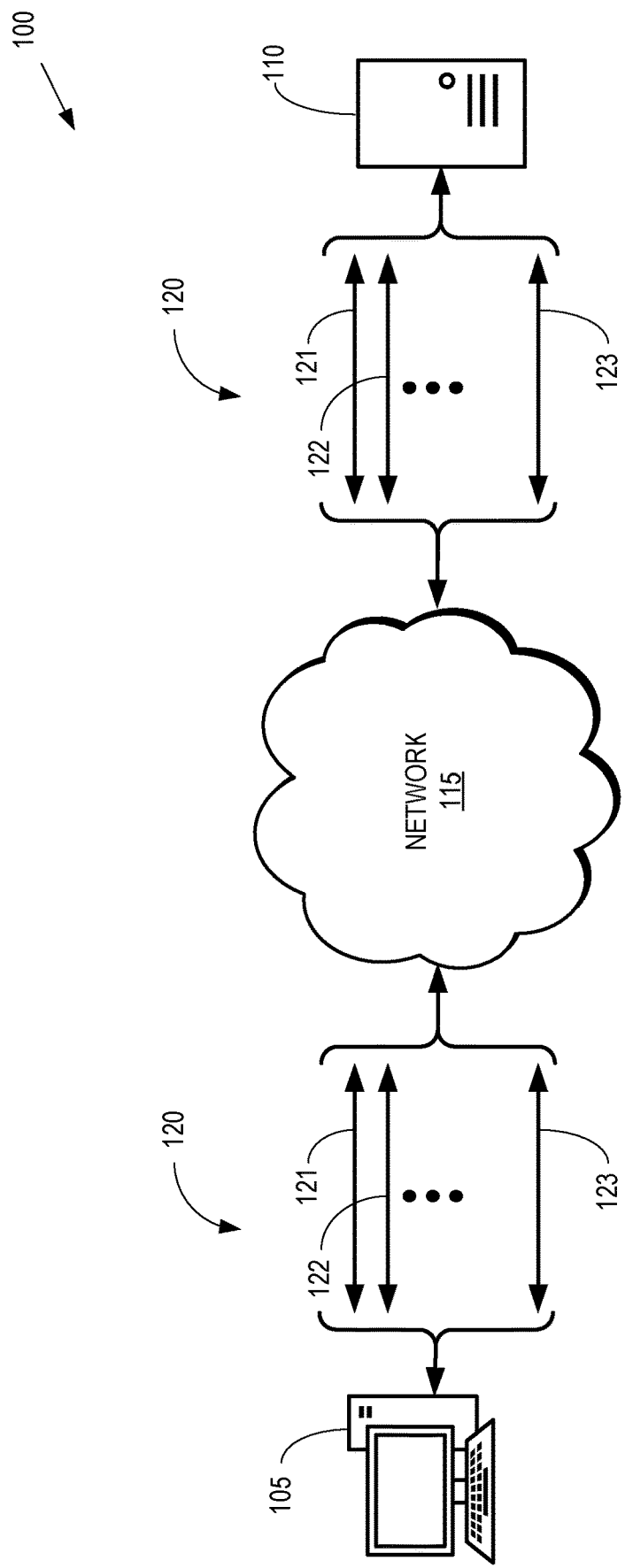
FIG. 1 is a block diagram of a communication system that supports tunneling of multiple protocols at multiple layers over a QUIC connection according to some embodiments.

Conventional connection-oriented reliable data transmission protocols introduce significant sources of latency. In some cases, the latency is due to transmission errors, corruption of packets transmitted over a connection, or congestion control (throttling) to reduce congestion along the network path. The TCP protocol treats errors on the connection as blocking operations and blocks further transfers of additional bytes until the error is resolved or the connection fails. Similarly, when TCP applies congestion control on the connection, it blocks or throttles down the rate of transfer of bytes until congestion is alleviated. If a single connection is conveying multiple streams of data, as is the case in the HTTP/2 protocol, the multiple streams are all blocked even though only one stream is experiencing an error or congestion. For example, transmission of an entire webpage can be blocked if a single error occurs while downloading a GIF for a favicon. Furthermore, the TCP protocol is designed to operate as a data pipe that transmits streams independent of the data included in the streams. Additional requirements such as applying encryption to the transmitted data using transport layer security (TLS) cryptographic protocols are configured by systems that run over TCP and use TCP to communicate with corresponding functionality at the other end of the connection. Configuring additional features of a connection (such as TLS) requires an additional handshake process following the handshake process used to configure TCP, which introduces multiple request/response message exchanges to establish the connection. Each message exchange adds latency associated with the communication between the client and server and so significant overhead can be added to the overall transmission.

The performance of connection-oriented applications is improved using the QUIC protocol (note that QUIC is not an acronym) to establish a set of multiplexed connections (also referred to herein as streams) between two endpoints using the connectionless user datagram protocol (UDP) as the transport layer protocol. Datagrams transmitted by connectionless UDP are individually addressed and routed based on information carried in each datagram. The QUIC protocol allows multiple streams of data to traverse the connection between endpoints independently and therefore independent of packet losses or congestion involving other streams in the connection. The QUIC protocol does not require ordering dependency among packets in the streams and the QUIC protocol performs error correction, loss recovery independently on different streams. Thus, the head-of-the-line (HOL) blocking delays experienced in TCP do not occur between different streams because lost or delayed packets in one stream do not affect the packets being conveyed in other streams of the connection. Congestion and flow control are applied independently to the streams in a QUIC connection. Either endpoint of a QUIC connection can start a stream in the connection at any time without requiring any handshake to start the stream and the streams can be bidirectional or unidirectional. In addition to reliable delivery and congestion control per stream, QUIC also integrates a security protocol. The initial QUIC handshake process includes the exchange of security keys and supported security protocols, thus speeding up the connection set-up process.

A QUIC connection is a stateful interaction between a client and a server that supports the exchange of data between endpoints by an application protocol. The endpoint that initiates the connection set-up is the "client" and the endpoint that waits for any potential incoming connection requests is the "server." The endpoints of the QUIC connection select numeric connection identifiers that uniquely identify the corresponding endpoint of the QUIC connection. Peer endpoints encode the connection identifier in QUIC packets that are sent over the QUIC connection to the endpoint that selected the connection identifier. For example, the client includes its (source) connection identifier and the server's (destination) connection identifier in a request sent to the server over the QUIC connection. The connection identifier ensures that changes in addressing at lower protocol layers (e.g., at the transport layer or network layer) don't cause packets transmitted on the QUIC connection to be delivered to the wrong endpoint. For example, the original connection identifier remains valid even if the user's Internet protocol (IP) address changes, e.g., during a network switching event such as a user equipment moving from a local Wi-Fi hotspot to a mobile network. For example, in the event of a connectivity failure between the client IP address and the server IP address or after a network switching event, the QUIC connection is reestablished by sending a packet with the connection identifier but with an alternate pair of IP addresses.

Version negotiation is performed during setup of the QUIC connection to ensure that both endpoints support the same version of QUIC. Once a version has been agreed upon, the endpoints perform transport and cryptographic handshaking to define the encryption protocol as well as other parameters such as the maximum amount of data transmitted per stream and the per-connection data maximums. During the cryptographic handshake, conventional QUIC uses an application layer protocol negotiation (ALPN) to negotiate an application protocol that is used by the endpoints, e.g., the ALPN is used to determine whether the QUIC connection uses a version of HTTP or a version of SPDY (not an acronym). Once the handshake is complete, the client and the server have agreed on an application protocol for the QUIC connection and a secure tunnel is established between the client and the server. The ALPN messages include a field that indicates the supported application layer protocol. Since the QUIC negotiation implements ALPN, the QUIC protocol is only available for application protocols and cannot be used for tunneling protocols at other layers such as data link layer protocols, network layer protocols, and the like. Consequently, the QUIC protocol cannot be used to support overlay networks such as a secured and reliable software defined wide area network (SD-WAN) that runs atop a public network because the QUIC connection cannot create secure and reliable tunnel for data link layer or network layer. Secondly, in ALPN only one protocol can be negotiated and consequently all streams in a QUIC connection must carry data for the single negotiated protocol. For example, streams of two applications, one over HTTP and another over SPDY cannot be multiplexed over a QUIC connection. Multiplexing multiple protocol data over a single QUIC connection also provides scalability because only one connection is required between a pair of endpoints. Furthermore, since the streams within a QUIC connection can be set up or torn down at any time without requiring any handshake to establish the streams, QUIC eliminates the set-up or teardown time to establish a secured and reliable tunnel for each multiplexed protocol.

FIGS. 1-19 disclose techniques for establishing a QUIC connection including one or more streams between two endpoints by exchanging extensions to security handshaking messages that include structures that indicate protocols supported by the endpoints at a set of layers. In some embodiments, the set of layers includes a data link layer, a network layer, a transport layer, and application layer protocols that utilize standardized ports such as transmission control protocol (TCP) ports, stream control transmission protocol (SCTP) ports, user datagram protocol (UDP) ports, and the like. The extension includes a structure that includes a list of supported layers and, for each supported layer, a list of supported protocols for the endpoint that transmits the extension. A client endpoint performs multi-protocol negotiation by building a QUIC packet and a corresponding extension that includes a list of the supported layers in protocols. The extension is added to a security message (such as a transport layer security, TLS, message) that is embedded in the QUIC packet and transmitted to the server endpoint. The server endpoint receives the QUIC packet from the client endpoint and determines whether the handshake includes the extension. If so, the server endpoint reads the layer/protocol list and resets any of the indicated protocols that are not supported by the server endpoint. The server endpoint then responds with an extension that indicates the supported protocols for each layer. The extension is added to a TLS message that is embedded in a handshake response.

Streams in a QUIC connection are created to tunnel data between endpoints at the negotiated layers and using the negotiated protocols in the layer/protocol lists of the extension. In response to an endpoint determining that data associated with a layer/protocol is available for transmission in a QUIC packet, the endpoint creates a stream frame and sets the layer type and protocol identifier fields in the frame to the values corresponding to the tunneling layer/protocol. The stream frame is then pushed onto the QUIC packet and transmitted to the other endpoint. In some embodiments, the QUIC packet is not sent immediately and instead waits for a time interval for other data to fill the QUIC packet. The receiving endpoint process the stream frames in the QUIC packet by identifying (or creating) the stream identifier and associating the stream identifier with the layer type and protocol identifier in the stream frame. The receiving endpoint verifies that the layer type and protocol identifier is consistent with the negotiated protocols for the stream and provides the data from the stream frame to the user protocol. Thus, multiple protocols at different layers can be tunneled using QUIC packets transmitted over a QUIC connection.

FIG. 1 is a block diagram of a communication system 100 that supports tunneling data from multiple protocols at multiple layers over a QUIC connection according to some embodiments. The communication system 100 includes a client 105 and a server 110 that communicate via a network 115. The client 105 and the server 110 have established a QUIC connection 120 that includes streams 121, 122, 123, which are collectively referred to herein as "the streams 121-123." Note that the reference numerals associated with the QUIC connection 120 refer to portions of the QUIC connection 120 on both sides of the network 115. Although three streams 121-123 are shown in FIG. 1, the QUIC connection 120 can include any number of streams and the streams can be established by either the client 105 or the server 110 at any time during the lifetime of the QUIC connection 120.

Stream identifiers are allocated to the streams by the client 105 and the server 110. In some embodiments, the client 105 and the server 110 observe stream identifier parity. For example, the client 105 uses even numbers as stream identifiers and the server 110 uses odd numbers as stream identifiers. The parity of the stream identifiers allows QUIC to spawn new streams at the client 105 or the server 110 without the need to undergo negotiations between each side to decide on a stream identifier. The QUIC streams support unidirectional and bidirectional streams and the directionality of the streams 121-123 is determined by setting the second to least significant bit in the stream identifier to a value indicating the directionality. For example, a bit value of (0) indicate a unidirectional stream and a bit value of (1) indicates a bidirectional stream. The bit reservations allow the streams 121-123 to be started at any time during the lifetime of the connection 120 without the need for negotiation. The client 105 and the server 110 are restricted to non-overlapping ranges of stream identifiers, thus avoiding stream identifier negotiations to avoid conflicts.

Information in the streams 121-123 is transmitted on a single-stream-per-packet basis (datagram mode) or by aggregating bytes from multiple streams 121-123 into a packet. If a QUIC packet transmitted over the QUIC connection 120 is dropped, every stream in that packet is blocked. For example, if a packet transmitted over the QUIC connection 120 includes bytes from the streams 121 and 122, both streams 121 and 122 are blocked if the packet is dropped. The QUIC implementation in the client 105 and the server 110 determines the number of streams to be sent per packet to limit the occurrences of blocking. The QUIC implementation trades off the flexibility of sending data for multiple streams in a single packet with the chance multiple streams are blocked when a dropped packet occurs. Once an endpoint of a stream has finished transmitting data, the endpoint sets a FIN bit on its last stream frame or the frame after the last stream frame to indicate the stream is closed in the direction of the endpoint, resulting in a half closed stream. Once both endpoints have sent stream frames with the FIN bit set, the stream is fully closed.

One or more of the streams 121-123 of the QUIC connection 120 are used to tunnel data concurrently on multiple layers using corresponding protocols. For example, the QUIC connection 120 can support a tunnel for data conveyed by between ethernet switches at a data link layer, data conveyed between IP routers at a network layer, and a web client and server at an application layer. To establish a multilayer/multiprotocol tunnel, the client 105 and the server 110 negotiate a version of a QUIC protocol that is supported for a QUIC connection 120 between the client 105 and the server 110. The client generates a cryptographic handshake (e.g. according to TLS) and embeds an extension in the cryptographic handshake. The extension includes a structure that indicates a set of protocols supported by the client 105 at a set of layers. The client 105 and the server 110 concurrently negotiate a subset of the protocols and a subset of the layers that are supported by the client 105 and the server 110. Data is tunneled from using the subset of the protocols and the subset of the layers over the QUIC connection 120. In some embodiments, the data is tunneled using stream frames that include the data, a first field having a value indicating a layer type, and a second field having a value indicating a protocol type in the layer.

Figure 2:
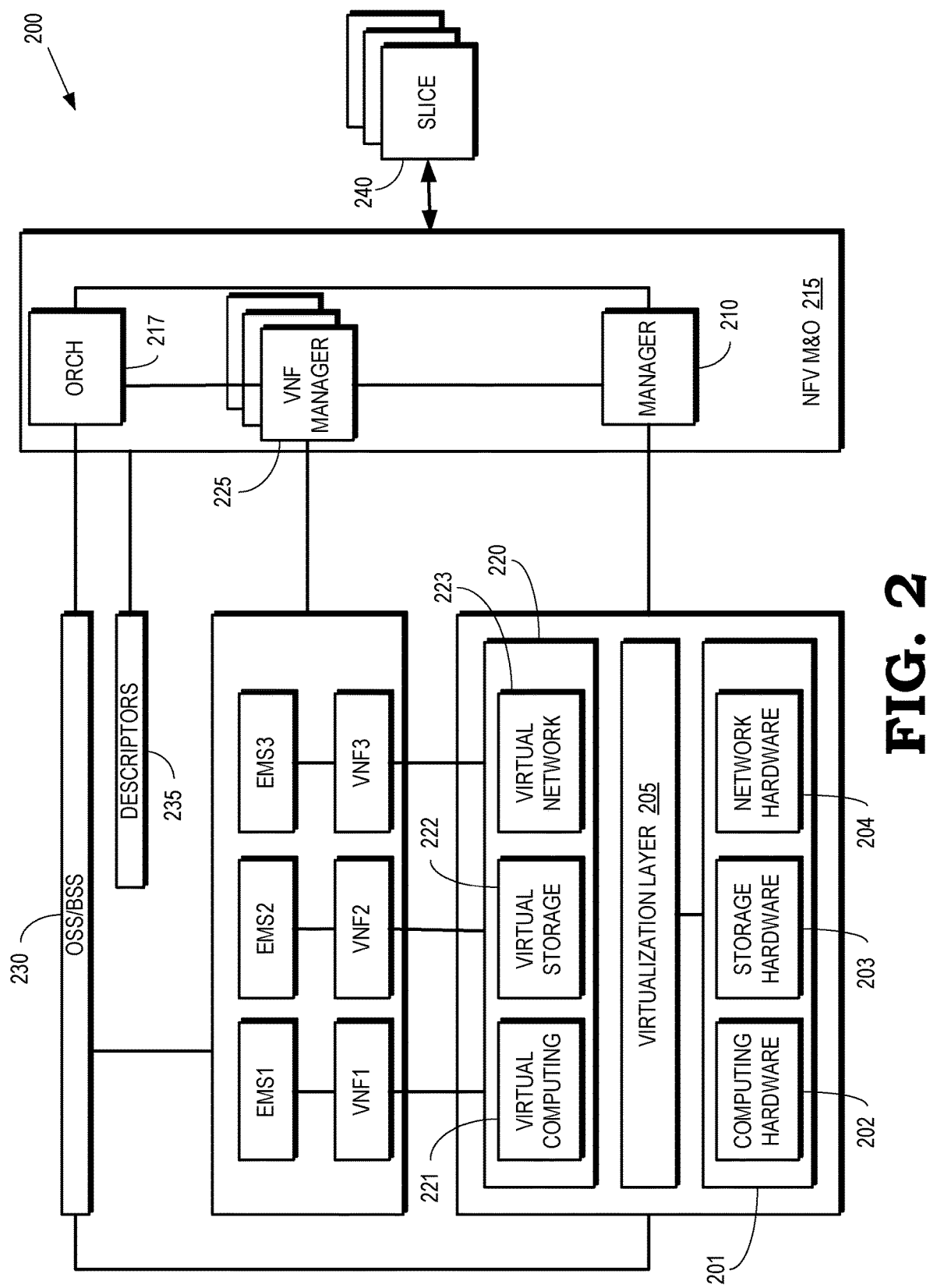
FIG. 2 is a block diagram of a network function virtualization (NFV) architecture according to some embodiments.

FIG. 2 is a block diagram of a network function virtualization (NFV) architecture 200 according to some embodiments. The NFV architecture 200 is used to implement some embodiments of the communication system 100 shown in FIG. 1. The NFV architecture 200 includes hardware resources 201 including computing hardware 202 such as one or more processors or other processing units, storage hardware 203 such as one or more memories, and network hardware 204 such as one or more transmitters, receivers, or transceivers. A virtualization layer 205 provides an abstract representation of the hardware resources 201. The abstract representation supported by the virtualization layer 205 can be managed using a virtualized infrastructure manager 210, which is part of the NFV management and orchestration (M&O) module 215. Some embodiments of the virtualized infrastructure manager 210 are configured to collect and forward performance measurements and events that may occur in the NFV architecture 200. For example, performance measurements may be forwarded to an orchestrator (ORCH) 217 implemented in the NFV M&O 215. The hardware resources 201 and the virtualization layer 205 may be used to implement virtual resources 220 including virtual computing 221, virtual storage 222, and virtual networking 223.

Virtual networking functions (VNF1, VNF2, VNF3) run over the NFV infrastructure (e.g., the hardware resources 201) and utilize the virtual resources 220. For example, the virtual networking functions (VNF1, VNF2, VNF3) are implemented using virtual machines supported by the virtual computing resources 221, virtual memory supported by the virtual storage resources 222, or virtual networks supported by the virtual network resources 223. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 225 that exchanges information and coordinates actions with the virtualized infrastructure manager 210 or the orchestrator 217.

The NFV architecture 200 may include an operation support system (OSS)/business support system (BSS) 230. The OSS/BSS 230 deals with network management including fault management using the OSS functionality. The OSS/BSS 230 also deals with customer and product management using the BSS functionality. Some embodiments of the NFV architecture 200 use a set of descriptors 235 for storing descriptions of services, virtual network functions, or infrastructure supported by the NFV architecture 200. Information in the descriptors 235 may be updated or modified by the NFV M&O 215.

The NFV architecture 200 can be used to implement network slices 240 that provide user plane or control plane functions such as services that are implemented in 5G networks, e.g., in a 5G service chain. A network slice 240 is a complete logical network that provides communication services and network capabilities, which can vary from slice to slice. User equipment can concurrently access multiple network slices 240. Some embodiments of user equipment provide Network Slice Selection Assistance Information (NSSAI) parameters to the network to assist in selection of a slice instance for the user equipment. A single NSSAI may lead to the selection of several network slices 240. The NFV architecture 200 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different network slices 240.

Figure 3:
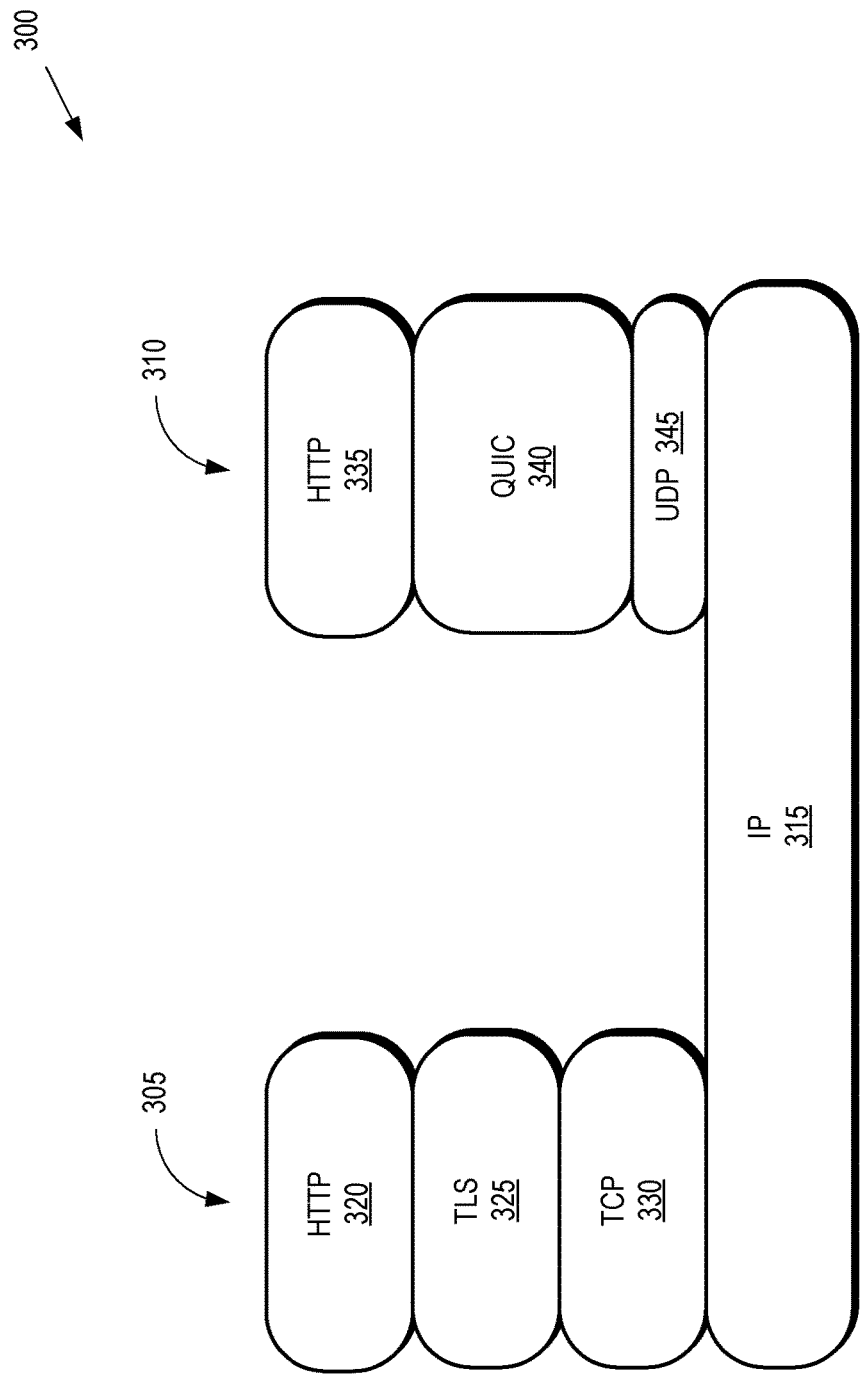
FIG. 3 is a block diagram of a comparison between a layer stack that supports HTTP or HTTP Secure (HTTPS) over TCP and a layer stack that supports QUIC over UDP according to some embodiments.

FIG. 3 is a block diagram of a comparison 300 between a layer stack 305 that supports HTTP or HTTP Secure (HTTPS) over TCP and a layer stack 310 that supports QUIC over UDP according to some embodiments. Both the layer stack 305 and the layer stack 310 are implemented over an Internet protocol (IP) layer 315. The layer stack 305 includes an HTTP layer 320 that supports multi stream communication, a TLS layer 325 that supports transmission of an encrypted payload, and the TCP layer 330 that provides congestion control and ensures reliable data streaming. The layer stack 310 includes an HTTP layer 335, a QUIC layer 340 that supports multi streaming, data encryption, congestion control, and reliable data streaming, and a UDP layer 345 that provides a connectionless transport layer protocol. Packets that are transmitted using HTTP over TLS are referred to as HTTPS packets.

Some embodiments of the layer stack 310 that supports a QUIC connection provides functionality including, but not limited to, multi-streaming capabilities, a reduction in the connection set up latency, a reduction of transport latency, secure transport, improved performance at network switchover, and a user space implementation.

As discussed herein, QUIC improves performance of connection-oriented applications by establishing one or more multiplexed connections (called streams) between two endpoints over UDP. Streams can be considered as subflows within the connection such that packets of each stream are treated independently. Thus, the connection allows
  multiple streams of data to reach an endpoint independently, and hence independent of packet losses involving other streams.
  no ordering dependency among the packets in streams. This solves the head-of-the-line (HOL) blocking delays as experienced in TCP, if any of the TCP packets are delayed or lost. Lost or delayed packets in one stream does not block other streams.
  Congestion/flow control to be applied to each stream independently.

The concept of streams in QUIC is like streams in SCTP. However, unlike SCTP, the QUIC streams can be started over a QUIC connection at any time by either endpoint. The streams can be either bidirectional or unidirectional. QUIC inherits the byte stream data model from TCP, so from the user application's perspective it is a stream-oriented protocol.

To reduce connection setup latency, QUIC reduces overhead during connection setup. As most HTTP connections demand a security protocol such as TLS, QUIC makes the exchange of setup keys and supported security protocols (e.g., TLS) as part of the initial handshake process. When a client opens a connection, the response packet includes the data needed for future packets to use encryption. This eliminates the need to set up the TCP connection first and then negotiate the security protocol via additional packets. Other protocols can be serviced in the same way, combining multiple steps into a single request-response. This data can then be used both for following requests in the initial setup, as well as future requests that would otherwise be negotiated as separate connections.

Transport latency is reduced because QUIC uses UDP as its basis, which does not include loss recovery. Instead, each QUIC stream is separately flow controlled and lost data is retransmitted at the level of QUIC, not UDP. Thus, if an error occurs in one stream, the QUIC stack 310 can continue servicing other streams independently. This improves performance on error-prone links, as in most cases considerable additional data is likely to be received after TCP notices a packet is missing or broken. The data received after the missing or broken packet is blocked or even flushed prior to correction of the error. In QUIC, this data is free to be processed while the single multiplexed stream is repaired.

QUIC supports encrypted transport and packets transported via a QUIC connection are authenticated and encrypted, preventing modification and ossification of the protocol by middleboxes. The encryption techniques are designed to improve overall latency and throughput when compared to the combined operation of TCP and TLS. For example, the packets are encrypted individually, so that they do not result in the encrypted data waiting for partial packets. This is not generally possible under TCP, where the encryption records are in a byte stream and the protocol stack is unaware of higher-layer boundaries within this stream. These can be negotiated by the layers running on top, but QUIC aims to do all of this in a single handshake process.

Some embodiments of the QUIC system improve performance during network-switch events such as the network switch events that occur when a user of a mobile device moves from a local WiFi hotspot to a mobile network. When this occurs on TCP, a lengthy process starts where every existing connection times out one-by-one and is then re-established on demand. To solve this problem, QUIC includes a connection identifier that uniquely identifies the connection to the server regardless of source. This allows the connection to be re-established simply by sending a packet, which always contains connection identifier, as the original connection identifier that is still valid even if the user's IP address changes.

QUIC can be implemented in the application-space (i.e., user space), as opposed to being in the operating system kernel. Being in user space allows rapid protocol revision without having to wait for system upgrades. Implementing QUIC in the user space also moves congestion control algorithms into the user space at both endpoints, which may allow these algorithms to improve more rapidly. Additionally, the protocol can be extended with forward error correction (FEC) to further improve performance when errors are expected.

As discussed above, the QUIC protocol implements connection identifiers for the connections between endpoints. Traditional transport layer protocols such as TCP, SCTP or UDP identify a connection based on a tuple {Source IP Address, Destination IP Address, Source Port Number, Destination Port Number}. However, in QUIC, each connection is identified with a numeric connection identifier. Each endpoint independently selects the connection ID that is encoded by the peer in QUIC packets sent to the endpoint. The primary function of a connection identifier is to ensure that changes in addressing at lower protocol layers (UDP, IP) don't cause packets for a QUIC connection to be delivered to the wrong endpoint. Each endpoint selects connection identifiers using an implementation-specific (and perhaps deployment-specific) method that allows packets with that connection identifier to be routed back to the endpoint and identified by the endpoint upon receipt.

FIG. 4 illustrates a format of a QUIC packet 400 according to some embodiments. The QUIC packet 400 includes of a common header followed by the payload of the QUIC packet 400. The payload includes a sequence of frames. When data from multiple streams are bundled together in the QUIC packet 400 then each frame carries data of one of the streams. The common header is either a long header or a short header.

FIG. 5 illustrates a format of a long header 500 for a QUIC packet according to some embodiments. The long header 500 is used as the common header in some embodiments of the QUIC packet 400 shown in FIG. 4. The long header 500 is included in QUIC packets that are sent during initial phases of set-up of a QUIC connection. Once the initial phases are complete, a sender switches to sending packets using the short header.

Packets that use the long header 500 contain the following fields:

Header Form: The most significant bit (0x80) of byte 0 (the first byte) is set to 1 in the long header 500.

Fixed Bit: The next bit (0x40) of byte 0 is set to 1. Packets containing a zero value for this bit are not valid packets in this version and are discarded.

Long Packet Type (T): The next two bits (those with a mask of 0x30) of byte 0 contain a packet type. Currently defined packet types are: 0x0=Initial, 0x01=0-RTT, 0x2=Handshake, 0x3=Retry.

Type-Specific Bits (X): The lower four bits (those with a mask of 0x0f) of byte 0 are type-specific.

Version: The QUIC Version is a 32-bit field that follows the first byte. This field indicates which version of QUIC is in use and determines how the rest of the protocol fields are interpreted.

DCID Len: The byte following the version contains the length in bytes of the Destination Connection ID field that follows this byte. This length is encoded as an 8-bit unsigned integer. In QUIC version 1, this value does not exceed 20. Endpoints that receive a version 1 long header with a value larger than 20 MUST drop the packet. Servers should be able to read longer connection IDs from other QUIC versions in order to properly form a version negotiation packet.

Destination Connection ID: The Destination Connection ID field follows the DCID Len and is between 0 and 20 bytes in length.

SCID Len: The byte following the Destination Connection ID contains the length in bytes of the Source Connection ID field that follows it. This length is encoded as an 8-bit unsigned integer. In QUIC version 1, this value does not exceed 20 bytes. Endpoints that receive a version 1 long header with a value larger than 20 MUST drop the packet. Servers should be able to read longer connection IDs from other QUIC versions in order to properly form a version negotiation packet.

Source Connection ID: The Source Connection ID field follows the SCID Len and is between 0 and 20 bytes in length.

Figure 6:
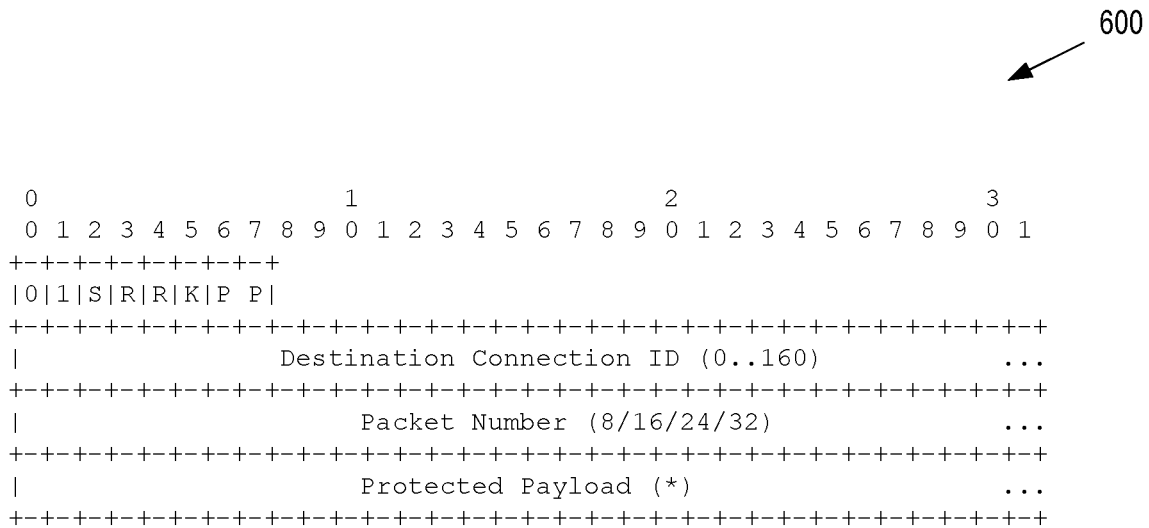
FIG. 6 illustrates a format of a short header for a QUIC packet according to some embodiments.

FIG. 6 illustrates a format of a short header 600 for a QUIC packet according to some embodiments. The short header 600 is used as the common header in some embodiments of the QUIC packet 400 shown in FIG. 4. The short header is included in QUIC packets that are after the initial phases of set-up of a QUIC connection.

Packets that use the short header 600 include the following fields:

Header Form: The most significant bit (0x80) of byte 0 is set to 0 for the short header.

Fixed Bit: The next bit (0x40) of byte 0 is set to 1. Packets containing a zero value for this bit are not valid packets in this version and are discarded.

Spin Bit (S): The third most significant bit (0x20) of byte 0 is the latency spin bit.

Reserved Bits (R): The next two bits (those with a mask of 0x18) of byte 0 are reserved. These bits are protected using header protection. The value included prior to protection is set to 0. An endpoint treats receipt of a packet that has a non-zero value for these bits, after removing both packet and header protection, as a connection error of type PROTOCOL_VIOLATION. Discarding such a packet after only removing header protection can expose the endpoint to attacks.

Key Phase (K): The next bit (0x04) of byte 0 indicates the key phase, which allows a recipient of a packet to identify the packet protection keys that are used to protect the packet.

Packet Number Length (P): The least significant two bits (those with a mask of 0x03) of byte 0 contain the length of the packet number, encoded as an unsigned, two-bit integer that is one less than the length of the packet number field in bytes. That is, the length of the packet number field is the value of this field, plus one.

Destination Connection ID: The Destination Connection ID is a connection ID that is chosen by the intended recipient of the packet.

Packet Number: The packet number field is 1 to 4 bytes long. The packet number has confidentiality protection separate from packet protection. The length of the packet number field is encoded in Packet Number Length field.

Protected Payload: Packets with a short header 600 include a1-RTT protected payload.

The header form bit and the connection ID field of a short header packet are version-independent. The remaining fields are specific to the selected QUIC version.

Figure 7:
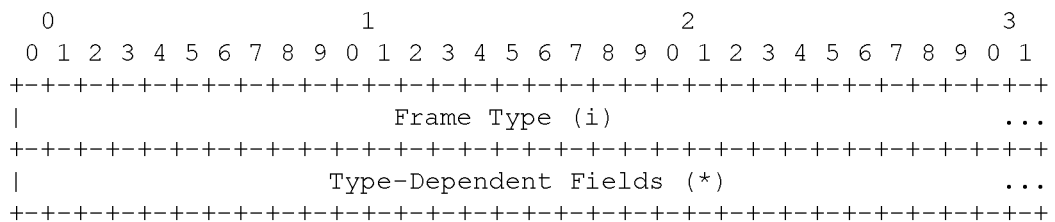
FIG. 7 illustrates a generic frame layout for a payload of a QUIC packet according to some embodiments.

FIG. 7 illustrates a generic frame layout 700 for a payload of a QUIC packet according to some embodiments. The generic frame layout 700 is used in some embodiments of the QUIC packet 400 shown in FIG. 4. The payload of QUIC packets, after removing the common header, includes a sequence of complete frames, as shown in FIG. 4. Not all packet types contain frames. However, the payload of a packet that contains frames contains one or more frames and may contain multiple frames and multiple frame types. Frames fit within a single QUIC packet and do not span multiple packets. Each frame begins with a Frame Type, indicating its type, followed by additional type-dependent fields.

Figure 8:
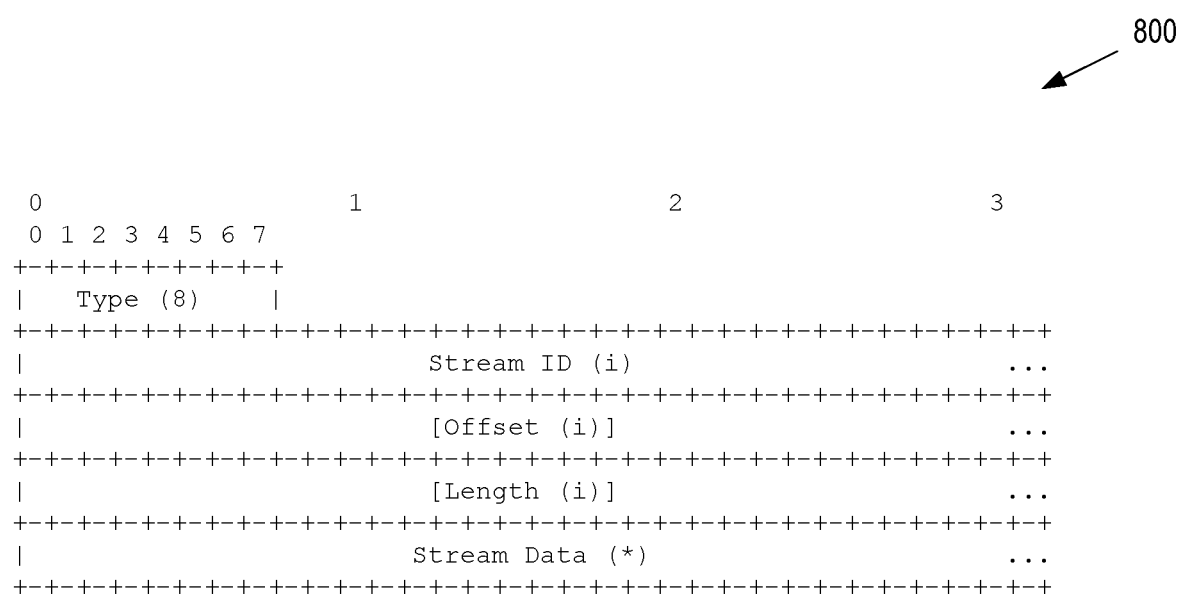
FIG. 8 illustrates a stream frame for a payload of a QUIC packet according to some embodiments.

FIG. 8 illustrates a stream frame 800 for a payload of a QUIC packet according to some embodiments. The stream frame 800 is used to carry the data in some embodiments of the QUIC packet 400 shown in FIG. 4. The stream frame 800 includes the following fields:

- Stream ID: A variable-length integer indicating the stream identifier of the stream.
- Offset: A variable-length integer specifying the byte offset in the stream for the data in the stream frame 800. This field is present when the OFF bit is set to 1. When the Offset field is absent, the offset is 0.
- Length: A variable-length integer specifying the length of the Stream Data field in the stream frame 800.
- Stream Data: The bytes from the designated stream to be delivered. When a Stream Data field has a length of 0, the offset in the stream frame 800 is the offset of the next byte that would be sent.

The first byte in the stream has an offset of 0. The largest offset delivered on a stream—the sum of the offset and data length—does not exceed $2^{62}-1$, as it is not possible to provide flow control credit for that data. Receipt of a frame that exceeds this limit is treated as a connection error of type FRAME_ENCODING_ERROR or FLOW_CONTROL_ERROR.

The QUIC protocol is a connection-oriented transport protocol follows a client-server relationship between the endpoints. A QUIC connection is a stateful interaction between a client and server, which supports the exchange of data by an application protocol. The endpoint that actively initiates the connection set-up is the client and the endpoint that waits for any potential incoming connection requests is the server. A connection identifier is used to uniquely identify a connection at an endpoint. As described in FIG. 5, the long header contains two connection identifiers, one for the destination and one for the source. During the connection setup (handshake), packets with the long header are used to establish the connection identifier that each endpoint uses. Each endpoint uses the Source Connection ID field to specify the connection identifier that is used in the Destination Connection ID field of packets being sent to them. When an initial packet is sent by a client that has not previously received an Initial or Retry packet from the server, it populates the Destination Connection identifier field with an unpredictable value. Until a packet is received from the server, the client uses the same value unless it abandons the connection attempt and starts a new one. The client populates the Source Connection ID field with a value of its choosing and sets the SCID Len field to indicate the length. Upon first receiving an Initial or Retry packet from the server, the client uses the Source Connection identifier supplied by the server as the Destination Connection identifier for subsequent packets.

A typical QUIC connection begins with version negotiation between two endpoints. An Initial packet with a long header is sent out by a client to determine if both endpoints support the same version of QUIC. The Version Negotiation packet is sent by the server if the client that sent out the initial packet is attempting to create a new connection and the client's version is not accepted by the server. If the initial packet's version is supported by the server or the client responds to the server's Version Negotiation packet with a supported version, the handshake process continues. After a version is settled on by both endpoints, the transport and cryptographic handshake begins.

The cryptographic handshake process uses a reserved substream, Stream 0. Some embodiments of QUIC use TLS 1.3 to encrypt the connection and authenticate the server and optionally authenticate the client. QUIC embeds the TLS functionality within the protocol itself, without having to run a separate TLS handshake and session after the transport handshake. During the cryptographic handshake, each endpoint advertises transport parameters that define the initial parameters for the connection. These transport parameters include values that determine the maximum amount of data that can be transmitted per stream, as well as per connection data maximums. These values are updated during the lifetime of a connection to facilitate flow control. During the cryptographic handshake, a conventional implementation of QUIC uses the Application Layer Protocol Negotiation (ALPN) extension of TLS for negotiation of an application protocol between the endpoints. Once a connection is established, substreams can be created during any point of the connection lifetime. QUIC also supports both unidirectional and bidirectional substreams and the directionality of a substream is determined during sub stream setup.

The ALPN is a TLS extension that introduces support for application protocol negotiation into the TLS handshake. For instances in which multiple application protocols are supported over QUIC, this extension allows the application layer to negotiate which application protocol will be used over the QUIC connection.

The extension type ("application_layer_protocol_negotiation(16)") is defined as follows:
enum {
    application_layer_protocol_negotiation(16), (65535)
} ExtensionType;

The "extension_data" field of the ("application_layer_protocol_negotiation(16)") extension contains a "ProtocolNameList" value as follows:
opaque ProtocolName<1 ... 2^8-1>;
struct {
    ProtocolName protocol_name_list<2 ... 2^16-1>
} ProtocolNameList;

"ProtocolNameList" contains the list of protocols advertised by the client, in descending order of preference. Protocols are named by IANA-registered, opaque, non-empty byte strings. Empty strings are not included, and byte strings are not truncated. Some embodiments of the process proceed as follows:

- The client appends a new ProtocolNameList field, containing the list of supported application protocols, into the ClientHello message.
- The server inspects the ProtocolNameList field and returns a ProtocolName field indicating the selected protocol as part of the ServerHello message.
- The server may respond with only a single protocol name, and if it does not support any that the client requests, then it may choose to abort the connection. As a result, once the TLS handshake is complete, both the secure tunnel is established, and the client and server are in agreement as to which application protocol will be used, they can begin communicating immediately.

The QUIC protocol includes functionality to start or teardown a stream during any point of the connection (aside from connection teardown). The parity of the stream identifier allows QUIC to spawn new streams on either the client-side or server-side without negotiations between each side to decide on a stream identifier. For example, the stream parity rules imply that a client only picks even numbers as stream identifiers and the server only picks odd numbers as stream identifiers. QUIC streams support unidirectional and bidirectional streams and the directionality of the stream determined by setting the second to least significant bit in the stream identifier. The bit reservations allow streams to be started at any time during the lifetime of a connection without negotiation. Each endpoint is restricted to their own non-overlapping range of identifiers, thus removing the need to negotiate for a stream identifier to avoid conflicts.

If a QUIC packet is dropped, every stream in that packet is blocked. The QUIC implementation determines the number of streams to be sent per packet to limit the occurrences of HOL blocking. The QUIC implementation chooses the number of streams to be sent per packet to balance the benefit of transmitting data for most or all its streams against the likelihood of stream blockage when a dropped packet occurs. Once an endpoint of a stream has finished transmitting its data, it will set the FIN bit on its last stream frame or the frame after the last stream frame to indicate the stream is closed in the direction of the endpoint, resulting in a half closed stream. Once both endpoints have sent stream frames with the FIN bit set, the stream is fully closed.

As a consequence of using the ALPN extension of TLS for negotiation of application protocols, QUIC is limited to supporting application protocols only. The conventional QUIC protocol cannot be used for tunneling any protocol at any layer, e.g. data link layer protocols, network layer protocols, etc. This limitation prevents QUIC from implementing secured and reliable network overlays such as secured SD-WAN or the like. An overlay network is a private network that runs atop a public network. Some embodiments of the QUIC protocol disclosed herein therefore tunnel packets of the overlay network over a QUIC connection, e.g., when the overlay network requires both security and reliable delivery of its packets. In some embodiments, tunneling is also used to multiplex multiple overlay networks over a QUIC connection.

Figure 9:
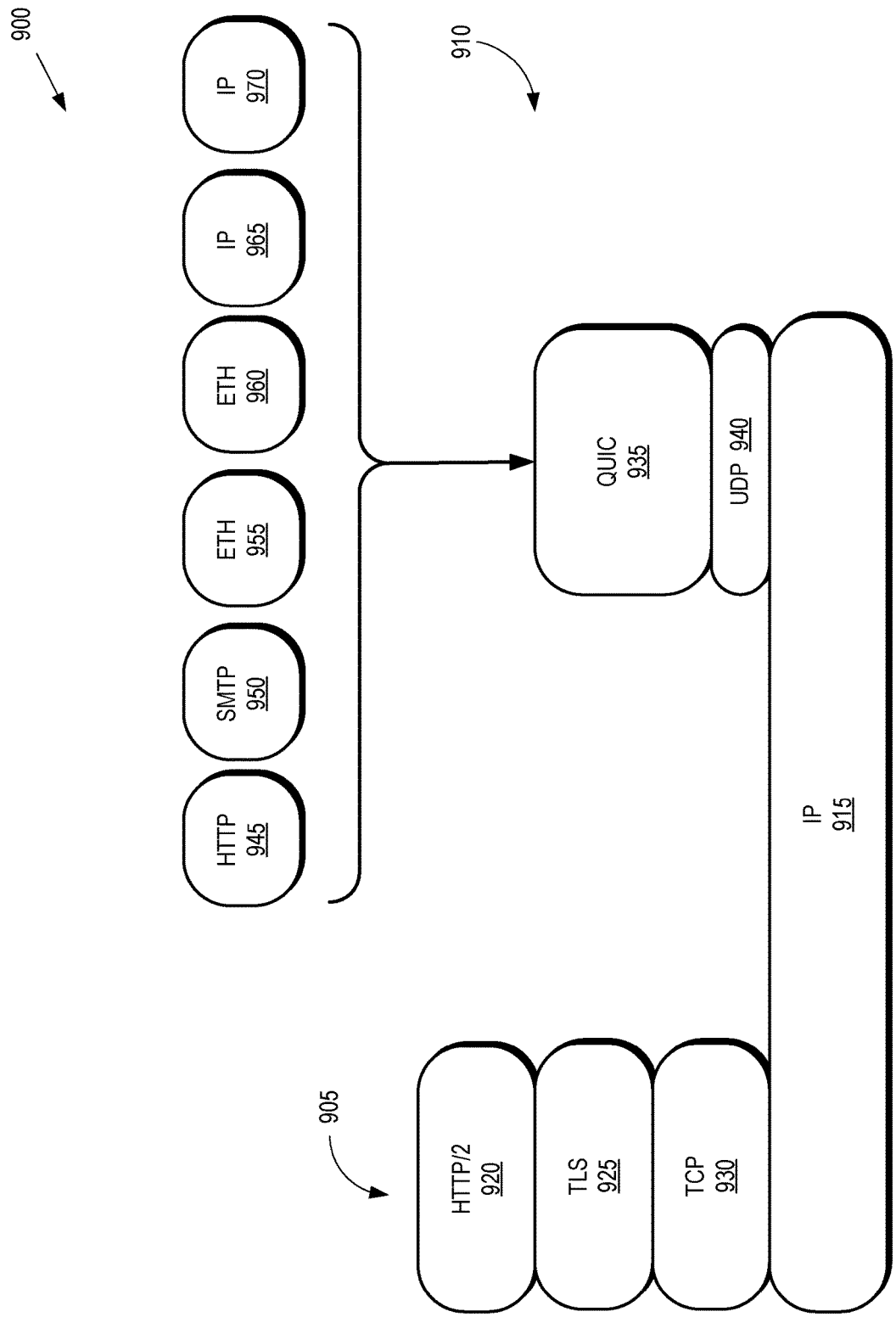
FIG. 9 is a block diagram of a comparison between a layer stack that supports HTTP over TCP and a layer stack that supports multilayer tunneling of protocols over QUIC according to some embodiments.

FIG. 9 is a block diagram of a comparison 900 between a layer stack 905 that supports HTTP over TCP and a layer stack 910 that supports multilayer tunneling of protocols over QUIC according to some embodiments. Both the layer stack 905 and the layer stack 910 are implemented over an Internet protocol (IP) layer 915. The layer stack 905 includes an HTTP layer 920 that supports multi stream communication, a TLS layer 925 that supports transmission of an encrypted payload, and a TCP layer 930 that provides congestion control and ensures reliable data streaming.

The layer stack 910 includes a QUIC layer 935 that supports multi streaming, data encryption, congestion control, and reliable data streaming. The layer stack 910 also includes a UDP layer 940 that provides a connectionless transport layer protocol. The layer stack 910 further includes multiple layers and protocols implemented over the QUIC layer 935. In the illustrated embodiment, the additional layers/protocols and include HTTP 945 and SMTP 950 (application layer), overlay networks 955, 960 that operate according to the ethernet protocol (data link layer), and IP networks 965, 970 (network layer).

Figure 10:
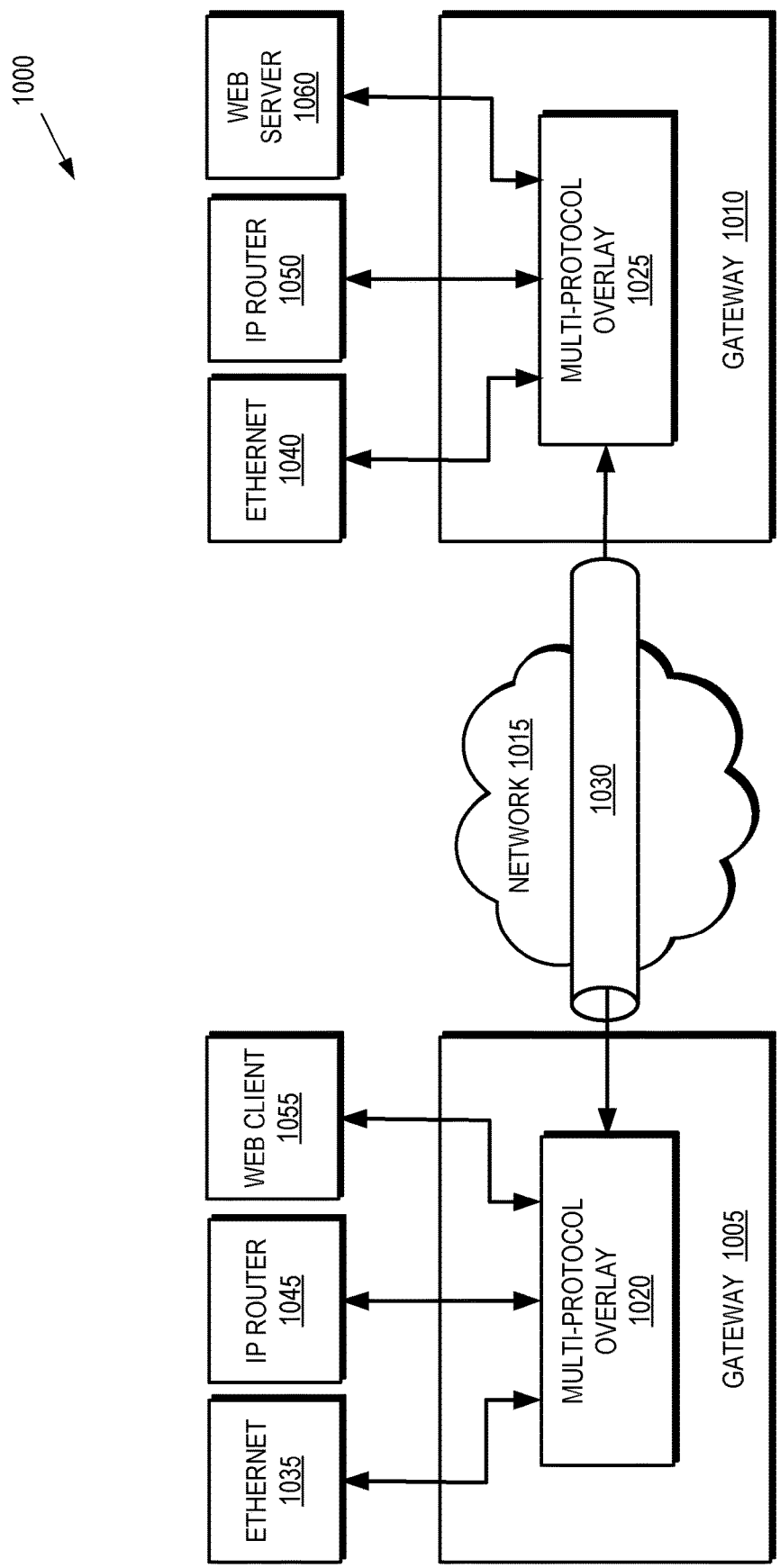
FIG. 10 is a block diagram of a communication system that supports multilayer tunneling of protocols over QUIC according to some embodiments.

FIG. 10 is a block diagram of a communication system 1000 that supports multilayer tunneling of protocols over QUIC according to some embodiments. The communication system 1000 implements some embodiments of the layer stack 910 shown in FIG. 9. The communication system 1000 includes gateways 1005, 1010 that are interconnected by an IP network 1015. The gateways 1005, 1010 include multi-protocol overlays 1020, 1025 that multiplex and tunnel packets from a set of private networks over a QUIC connection between the gateways 1005, 1010 via a tunnel 1030. The QUIC connection is established over UDP and IP protocols and the QUIC connection provides secure and reliable delivery of the packets for the private networks or applications, which can operate at any protocol layer. In the illustrated embodiment, the tunnel 1030 is used to convey packets between ethernet switches 1035, 1040, IP routers 1045, 1050, and a web client 1055 and a web server 1060.

Some embodiments of the communication system 1000 uses the tunnel 1030 over the QUIC connection to transport packets of any protocol at any layer. In some cases, multiple protocols are concurrently transported over the tunnel 1030 of the QUIC connection. As used herein, the phrase "any protocol at any layer" means a protocol could be any data link layer protocol, any network layer protocol, any transport layer protocol, or any application layer protocol. Some embodiments of the tunneling techniques disclosed herein are segregated into two phases: (1) multi-protocol negotiation during setup of the QUIC connection and (2) exchange of multi-protocol data over the QUIC connection.

During the QUIC connection set-up phase, end points negotiate the supported protocols at one or more layers. For example, the gateways 1005, 1010 (or the multiprotocol overlays 1020, 1025) shown in FIG. 10 can negotiate supported protocols at the data link layer, the network layer, the transport layer, or the application layer. The negotiation includes negotiating:
  Whether endpoints can tunnel data link layer protocols (e.g., Ethernet, PPP (Point-to-Point Protocol), POS (Packet-over-Sonet)) on the TLS session. If supported, then the list of data link layer protocols is negotiated.
  Whether endpoints can tunnel network layer protocols (e.g., IP, MPLS etc) on the QUIC connection. If supported, then the list of network layer protocols is negotiated.
  Whether endpoints can tunnel existing transport layer protocols (e.g., TCP, SCTP etc) on the QUIC connection. If supported, then the list of transport protocols is negotiated.
  Whether endpoints support application layer protocols (HTTP, SMTP etc). If supported, then the list of application protocols is negotiated.

This negotiation technique is referred to herein as a multi-layer protocol negotiation (MLPN).

During the data exchange phase, after the connection is set-up, the endpoints exchange packets for the supported protocols using the generic stream frame such as the generic stream frame 700 shown in FIG. 7. As discussed herein, the header of the generic stream frame carries fields from conventional stream frames and also carries the fields for the following:
  Layer Type—Data Link or Network or Transport or Application.
  Protocol Type—The protocol within the layer type. If layer type is data link, then this field contains a values defined by this invention for the data link layer. If layer type is network, then this field contains standardized Ethertype value for the network layer. If layer type is transport, then this field contains the standardized Protocol value in IP. If layer type is application then this field carries the standardized port numbers in TCP, SCTP, UDP etc.
  Mode—Datagram or stream mode. In datagram mode, a frame carries the whole packet of the protocol. In stream mode, the packets of the protocol are sent as a byte stream, so an intermediate layer is needed between QUIC and the protocol (user of QUIC) to scan for the protocol specific headers to figure out the protocol packet boundaries. Thus, the QUIC packet can be transmitted with at least one stream frame in a datagram mode or the QUIC packet can be transmitted with at least one stream frame in a stream mode.

Support of protocol layers and specific protocol types in each layer is negotiated during QUIC connection establishment. In some embodiments, QUIC uses an MLPN extension in TLS during the handshake procedure to negotiate concurrent support of multiple protocols at any protocol layers. The MLPN extension in TLS uses an extension type ("multi_layer_protocol_negotiation(20)") that is defined for TLS and may be included by endpoints in TLS to negotiate multi-protocol support during TLS handshake procedure. An example of the MLPN extension is:

```
enum {
    multi_layer_protocol_negotiation(20), (65535)
} ExtensionType;
```

The "extension_data" field of the ("multi_layer_protocol_negotiation(16)") extension contains a "MultiLayerProtocolList" value such as the following:

```
opaque LayerName<1 . . . 2^8-1>;
struct {
    uint_16 protocol_list<2 . . . 2^16-1>;
} ProtocolList;
struct {
    LayerName layer_name;
    ProtocolList protocols;
} LayerProtocolList;
struct {
    LayerProtocolList layer_protocol_list <2 . . . 2^16-1>
} MultiLayerProtocolList;
```

In the above structure, "LayerName" contains the name of the protocol layer. Protocol layers are named by opaque, non-empty byte strings. Empty strings are not included and byte strings are not truncated. In some embodiments, the following layer names are used:

Data Link Layer="dlink"
Network Layer="network"
Transport Layer="transport"
Application layer protocols with standardized TCP ports="app/tcp"
Application layer protocols with standardized SCTP ports="app/sctp"
Application layer protocols with standardized UDP ports="app/udp"

In the above structure, "ProtocolList" contains a list of 16-bit values, wherein each value identifies a protocol. The value of the protocols is dependent on the layer for which the ProtocolList is applicable. In some embodiments, the following layer-wise values of protocols are used:

For "dlink", following protocol values are defined.
Ethernet=1, PPP (Point-to-Point Protocol)=2, HDLC (High-Level Data Link Control)=3, IEEE 802.11 wireless LAN=4, LLDP (Link Layer Discovery Protocol)=LLDP=5, Frame Relay=6.
For "network", the standardized Ethertype values are to be used. By this, all existing network layer protocols automatically applicable in this extension.
For "transport", the standardized Protocol Type values are to be used. By this, all existing transport layer protocols as well as other user protocols of network layer (e.g ICMP) are automatically applicable in this extension.
For "app/tcp", the standardized TCP port numbers of the application protocols that run atop TCP are to be used.
For "app/udp", the standardized UDP port numbers of the application protocols that run atop UDP are to be used.
For "app/sctp", the standardized SCTP port numbers of the application protocols that run atop SCTP are to be used.

Figure 11:
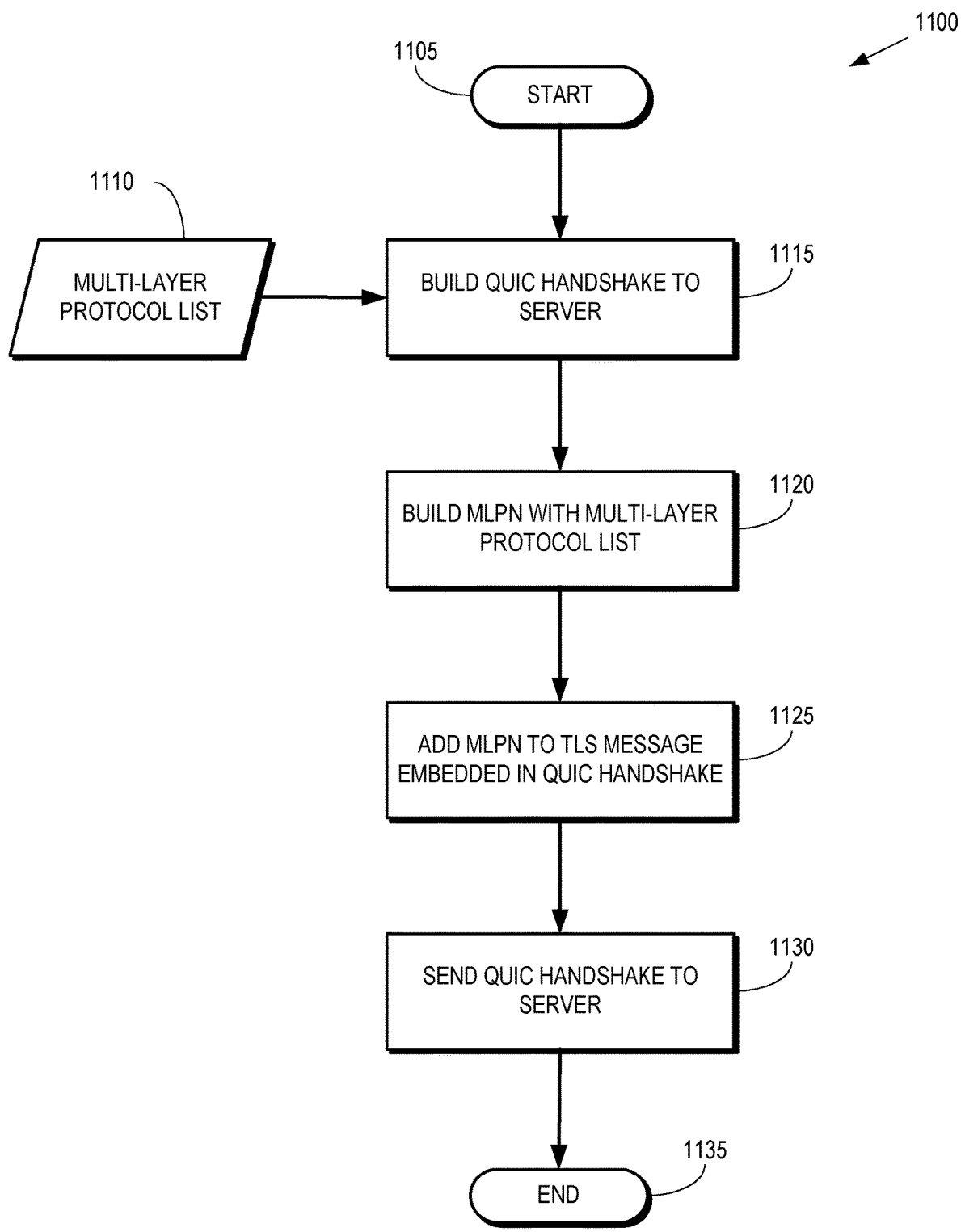
FIG. 11 is a flow diagram of a method implemented by a client for multi-protocol negotiation during setup of a QUIC connection according to some embodiments.

FIG. 11 is a flow diagram of a method 1100 implemented by a client for multi-protocol negotiation during setup of a QUIC connection according to some embodiments. The method 1100 is implemented in some embodiments of the client 105 shown in FIG. 1 and the gateway 1005 shown in FIG. 10.

The method 1100 starts at the block 1105. The method 1100 receives input 1110 that includes a set of layers and a set of protocols in each layer that are supported by the endpoint, e.g., the client. In some embodiments, the input 1110 is provided in the format of a multilayer protocol list, as discussed herein.

At block 1115, the client builds a QUIC packet to send a QUIC handshake to the server. At block 1120, the client builds an MLPN extension using the information provided in the input 1110. For example, the MLPN extension can include a structure that is populated using the set of layers and the set of protocols provided in the multilayer protocol list. At block 1125, the client adds the MLPN extension to a security message such as a TLS message embedded within the QUIC packet for the handshake. At block 1130, the client sends the QUIC packet to the server (e.g., via UDP over IP). The method 1100 then terminates at block 1135.

Figure 12:
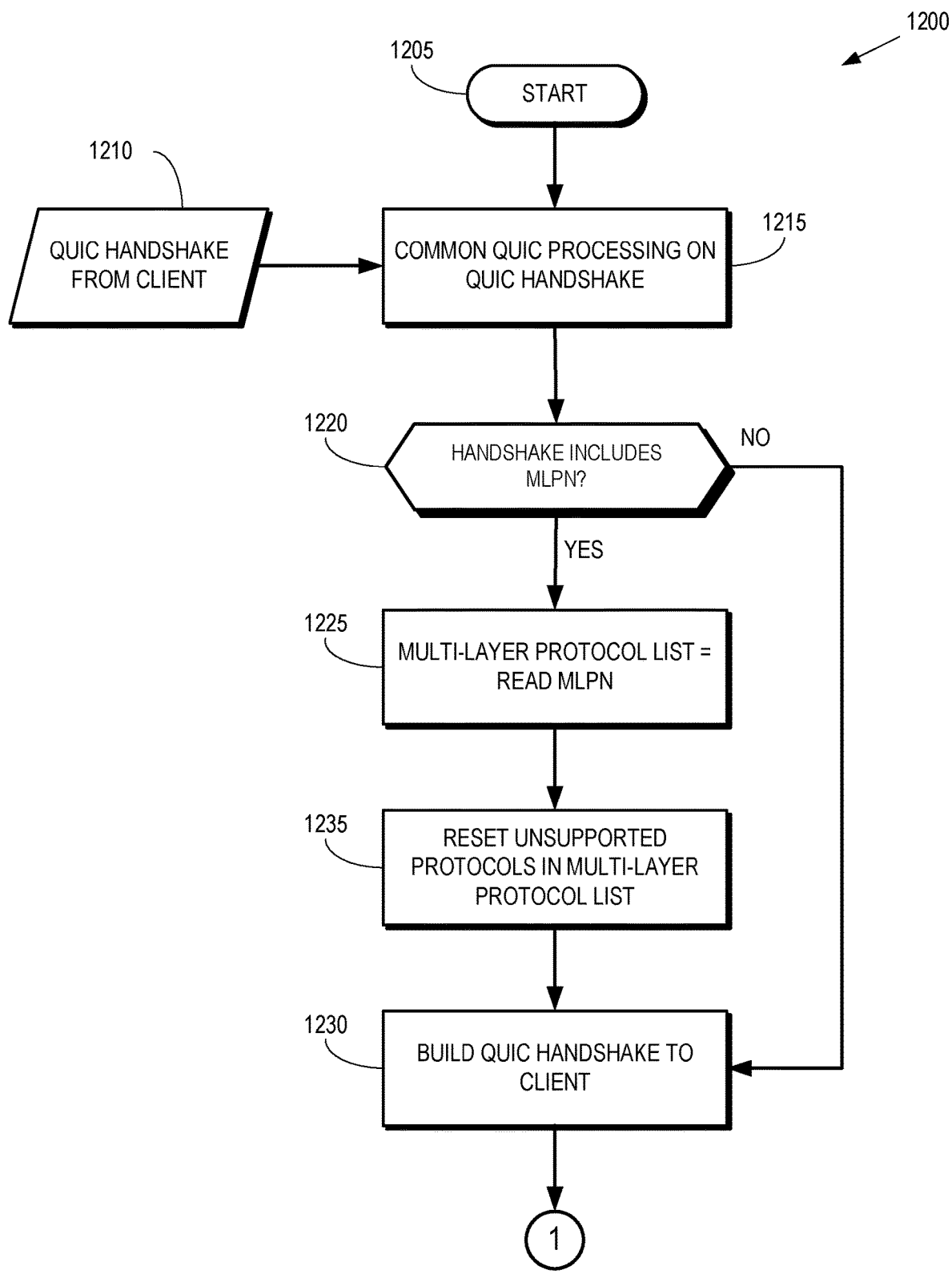
FIG. 12 is a flow diagram of a first portion of a method implemented by a server for multi-protocol negotiation during setup of a QUIC connection according to some embodiments.

FIG. 12 is a flow diagram of a first portion of a method 1200 implemented by a server for multi-protocol negotiation during setup of a QUIC connection according to some embodiments. The method 1200 is implemented in some embodiments of the server 110 shown in FIG. 1 and the gateway 1010 shown in FIG. 10.

The method 1200 begins at the block 1205. The method 1200 receives input 1210 that includes the QUIC handshake received from the client, e.g., the QUIC handshake provided by the client in the method 1100 shown in FIG. 11. At block 1215, the server performs processing on the QUIC handshake using conventional QUIC procedures. At decision block 1220, the server determines whether the handshake received from the client includes the MLPN extension. If so, the method 1200 flows to the block 1225. If the handshake received from the client does not include the MLPN extension, the method 1200 flows to the block 1230.

At block 1225, the server reads the multilayer protocol list from the QUIC handshake received from the client. At block 1235, the server determines which of the protocols in the multilayer protocol list are supported at the server and resets the protocols that are not supported by the server. The method 1200 then flows to the block 1230.

At block 1230, the server builds the QUIC handshake response that will be returned to the client. The method 1200 then flows to the node 1, which connects to the corresponding node 1 shown in FIG. 13 described below.

Figure 13:
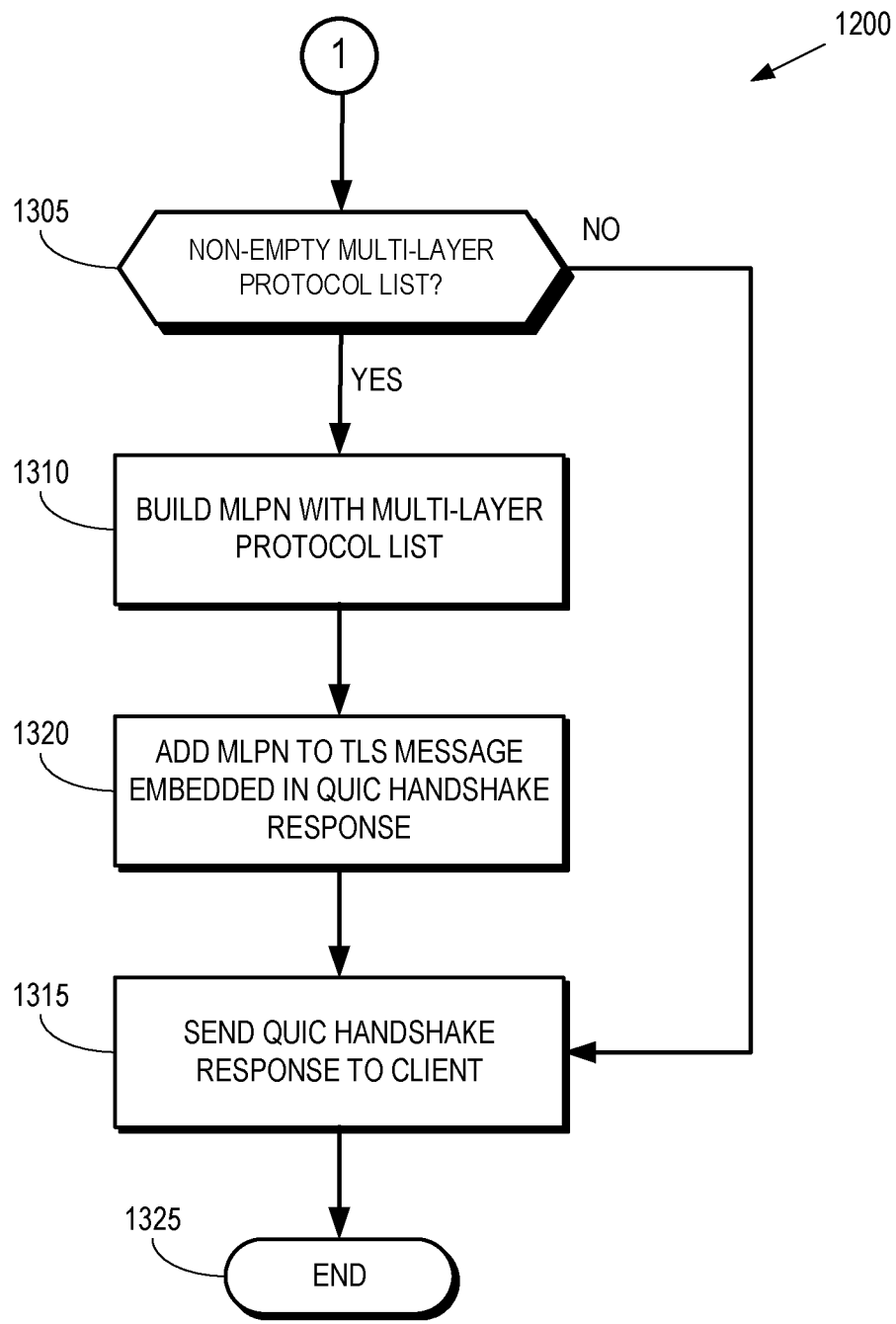
FIG. 13 is a flow diagram of a second portion of the method implemented by the server for multi-protocol negotiation during setup of a QUIC connection according to some embodiments.

FIG. 13 is a flow diagram of a second portion of the method 1200 implemented by the server for multi-protocol negotiation during setup of a QUIC connection according to some embodiments. The second portion of the method 1200 begins at the node 1, which corresponds to the node 1 shown in FIG. 12 described above. The method 1200 flows from the node 1 to the decision block 1305.

At decision block 1305, the server determines whether the multilayer protocol list of supported protocols is non-empty. In some cases, if the server does not support any of the protocols listed in the input 1205 received from the client, the multilayer protocol list of supported protocols is empty. Otherwise, the server supports at least one of the protocols in common with the client. If the multilayer protocol list is non-empty, the method 1200 flows to the block 1310. If the multilayer protocol list is empty, the method 1200 flows to the block 1315.

At block 1310, the server builds an MLPN extension from the multilayer protocol list of the supported protocols. At block 1320, the server adds the MLPN extension to a TLS message embedded in the QUIC handshake response. The method 1200 then flows to the block 1315.

At block 1315, the server sends the QUIC handshake response (e.g., via UDP over IP) to the client. The method 1200 then flows to the block 1325 and the method 1200 terminates.

FIG. 14 illustrates a generic stream frame 1400 that is used to transport data from any protocol in a tunnel over a QUIC connection according to some embodiments. The generic stream frame 1400 is used to transmit multiprotocol/multilayer data between some embodiments of the client 105 and the server 110 shown in FIG. 1 and the gateways 1005, 1010 shown in FIG. 10.

The definition of the fields in the generic stream frame 1400 are as follows:
- Type: This 8-bit field is the common field for any QUIC frame that indicates the type of the frame. The current QUIC specification defines frame types with values from 0x00-0x1e. In some embodiments, the value 0x20 is allocated to indicate the generic stream frame 1400.
- Flags: This 4-bit field carries the following flags:
  - The HEADER bit (0x8) field is applicable only when the payload (Stream Data field) is datagram oriented (e.g., Ethernet, IP etc). When set, it means that Stream Data starts with the beginning of a datagram (i.e., header of the protocol packet). If not set, then it means the Stream Data carries a fragment of a protocol packet. This also means multiple datagrams cannot be packed on a single frame. Since the streams in QUIC delivers the frames sequentially, so it is not required to indicate offset of a fragment with respective to the original packet.
  - The OFF bit (0x4) is set to indicate that there is an Offset field present. When set to 1, the Offset field is present. When set to 0, the Offset field is absent and the Stream Data starts at an offset of 0 (that is, the frame contains the first bytes of the stream, or the end of a stream that includes no data).
  - The LEN bit (0x2) is set to indicate that there is a Length field present. If this bit is set to 0, the Length field is absent, and the Stream Data field extends to the end of the packet. If this bit is set to 1, the Length field is present.
  - The FIN bit (0x1) is set only on frames that contain the final size of the stream. Setting this bit indicates that the frame marks the end of the stream.
- Layer Type: This 4-bit field indicates the layer of protocol packet carried in the frame. This invention defines the following values.
  - 0x01=Data Link Layer
  - 0x02=Network Layer
  - 0x03=Transport Layer. which includes non-transport protocols that run over Network Layer.
  - 0x04=Application Layer with TCP ports, which includes all application protocols that have standardized TCP port numbers.
  - 0x05=Application Layer with UDP ports, which includes all application protocols that have standardized TCP port numbers.
  - 0x06=Application Layer with SCTP ports, which includes all application protocols that have standardized TCP port numbers.
- Protocol ID: This 16-bit field indicates the protocol within the Layer Type. The values are dependent on the Layer Type field.
  - When Layer Type is Data Link Layer (0x01) then values in this field are defined as follows:
    - Ethernet=1, PPP (Point-to-Point Protocol)=2, HDLC (High-Level Data Link Control)=3, IEEE 802.11 wireless LAN=4, LLDP (Link Layer Discovery Protocol)=LLDP=5, Frame Relay=6.
    - Data link layer protocols not included in the above list may be assigned values in the range 7-65535.
  - When Layer Type is Network Layer (0x02) then values in this field are set according to the standardized values for Ethertypes.
  - When Layer Type is Transport Layer (0x03) then values in this field are set according to the standardized values for Internet Protocol Numbers.
- Stream ID: A variable-length integer indicating the stream identifier of the stream.
- Offset: A variable-length integer specifying the byte offset in the stream for the data in the generic stream frame 1400. This field is present when the OFF bit is set to 1. When the Offset field is absent, the offset is 0.
- Length: A variable-length integer specifying the length of the Stream Data field in the generic stream frame 1400. This field is present when the LEN bit is set to 1. When the LEN bit is set to 0, the Stream Data field consumes all the remaining bytes in the packet.
- Stream Data: This variable length field consists of the bytes from the designated stream to be delivered. If the HEADER bit is set then in case of Ethernet Packet, it starts with the Ethernet Header, in case of IPv4 packet, it starts with the IP Header etc.

Figure 15:
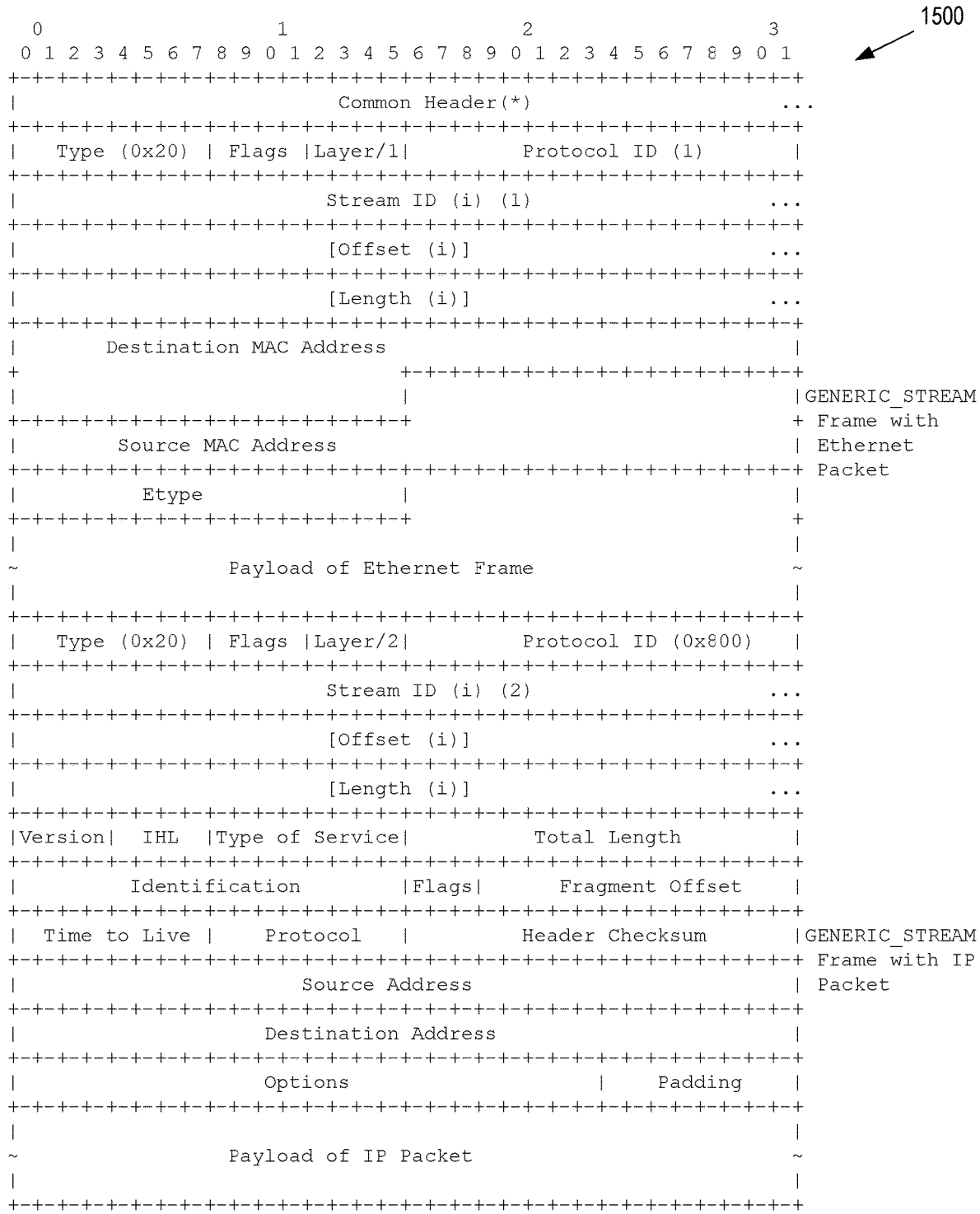
FIG. 15 illustrates an encoding of a QUIC packet that is used for concurrent ethernet and IP tunneling over a QUIC connection according to some embodiments.

FIG. 15 illustrates an encoding of a QUIC packet 1500 that is used for concurrent ethernet and IP tunneling over a QUIC connection according to some embodiments. The QUIC packet 1500 is implemented in some embodiments of the communication system 100 shown in FIG. 1 and the communication system 1000 shown in FIG. 10. In the illustrated embodiment, the stream ID 1 carries an ethernet frame and the stream ID 2 carries an IP packet.

Figure 16:
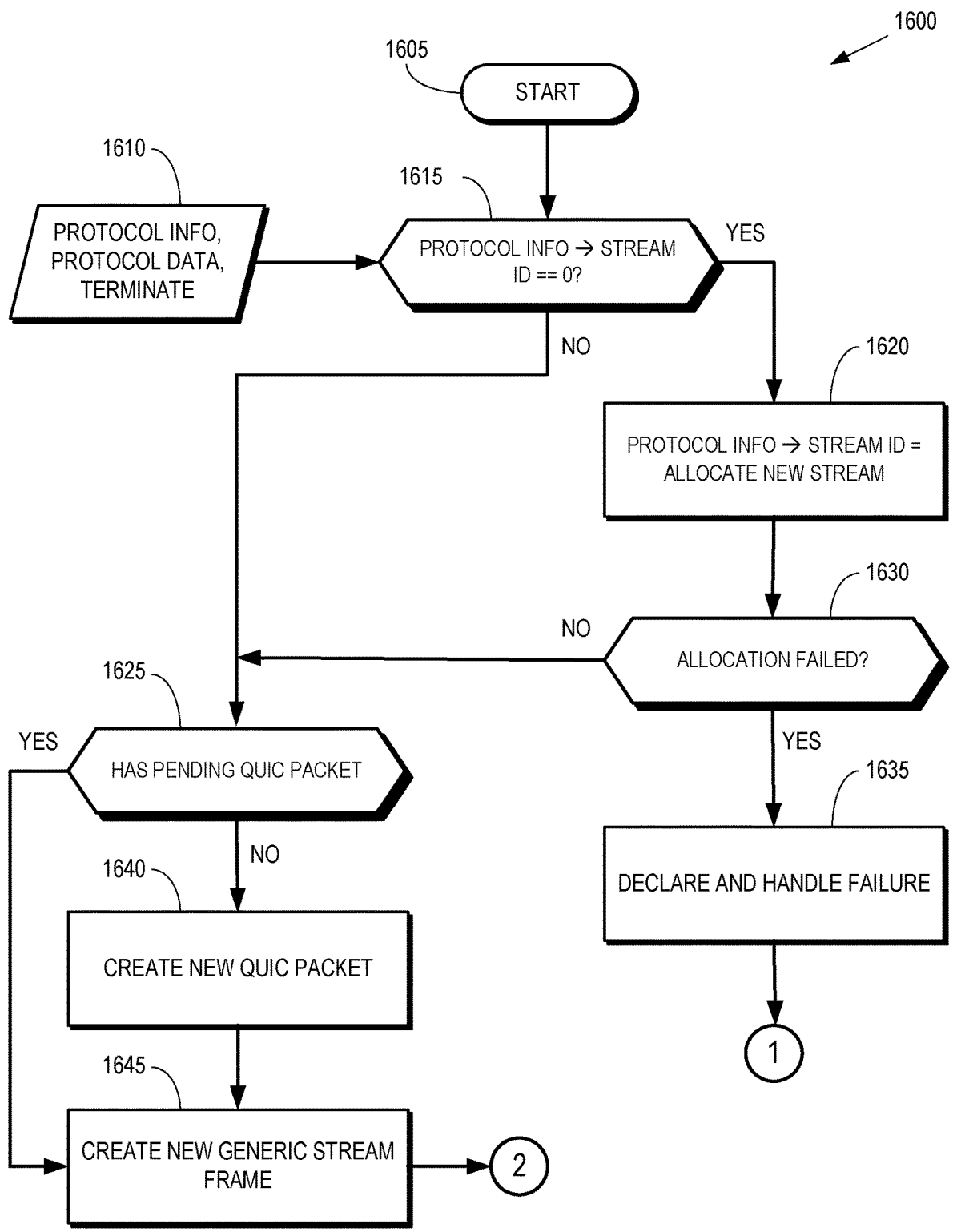
FIG. 16 is a flow diagram of a first portion of a method of transmitting a generic stream frame to tunnel a protocol from a QUIC endpoint to a peer according to some embodiments.

FIG. 16 is a flow diagram of a first portion of a method 1600 of transmitting a generic stream frame to tunnel a protocol from a QUIC endpoint to a peer according to some embodiments. The method 1600 is implemented in some embodiments of the client 105 and the server 110 shown in FIG. 1, and the gateway 1005 and 1010 shown in FIG. 10. In some embodiments, the method 1600 transmits instances of the generic stream frame 1400 shown in FIG. 14.

The method 1600 starts at the block 1605. The client (or server) receives input 1610, which includes:
- Protocol_Info, contains Stream identifier, Layer Type, and Protocol identifier of the transmitted packet. If this is the first packet for the stream, then Stream identifier is not allocated yet and so Stream identifier is input as 0.
- Protocol_Data, the packet/payload of the protocol to be sent.
- Terminate, a boolean, if set to TRUE means the stream needs to be terminated after sending this packet.

At decision block 1615, the client (or server) determines whether the stream identifier provided in the protocol information from the input 1610 indicates that this is the first packet for the stream (e.g., the value of the stream identifier is 0). If this is the first packet for the stream (e.g., the value of the stream identifier is 0), the method 1600 flows to block 1620. If this is not the first packet for the stream (e.g., the value of the stream identifier is not equal to 0), the method 1600 flows to the decision block 1625.

At block 1620, the client (or server) allocates a new stream identifier and creates state for the stream. The stream is also mapped to the Protocol_Info that is included in the input 1610 so that Protocol_Info provides the assigned stream identifier for subsequent packets for the stream. Allocation of the stream identifier uses conventional procedures defined in the QUIC specification. The method 1600 then flows to decision block 1630 and the client (or server) determines whether the stream identifier allocation succeeded or failed. If the stream identifier allocation failed, the method 1600 flows to the block 1635 to declare and handle the failure. The method 1600 then flows to the node 1, which connects to the corresponding node 1 in FIG. 17 discussed below. If the stream identifier allocation succeeded, the method 1600 flows to the decision block 1625.

At decision block 1625, the client (or server) determines whether a QUIC packet is pending to be sent to the peer, e.g., a server. In some embodiments, the client (or server) does not send a QUIC packet immediately if the optimum size of the QUIC packet has not been filled with other information. In that case, the client (or server) waits for a predetermined time interval to see if more protocol data arrives. If no QUIC packet is pending, the method 1600 flows to the block 1640 and the client (or server) creates a new QUIC packet. The method 1600 then flows to the block 1645. If a QUIC packet is pending, the method 1600 flows from the decision block 1625 to the block 1645 because it is not necessary to create a new QUIC packet.

At block 1645, the client (or server) creates a new generic stream frame to carry the protocol data. For example, the client (or server) creates an instance of the generic stream frame 700 shown in FIG. 7. The layer type field and the protocol identifier field in the generic stream frame are set to the values indicated in the protocol information received in the input 1610. The method 1600 then flows to the node 2, which connects to the corresponding node 2 in FIG. 17 as discussed below.

Figure 17:
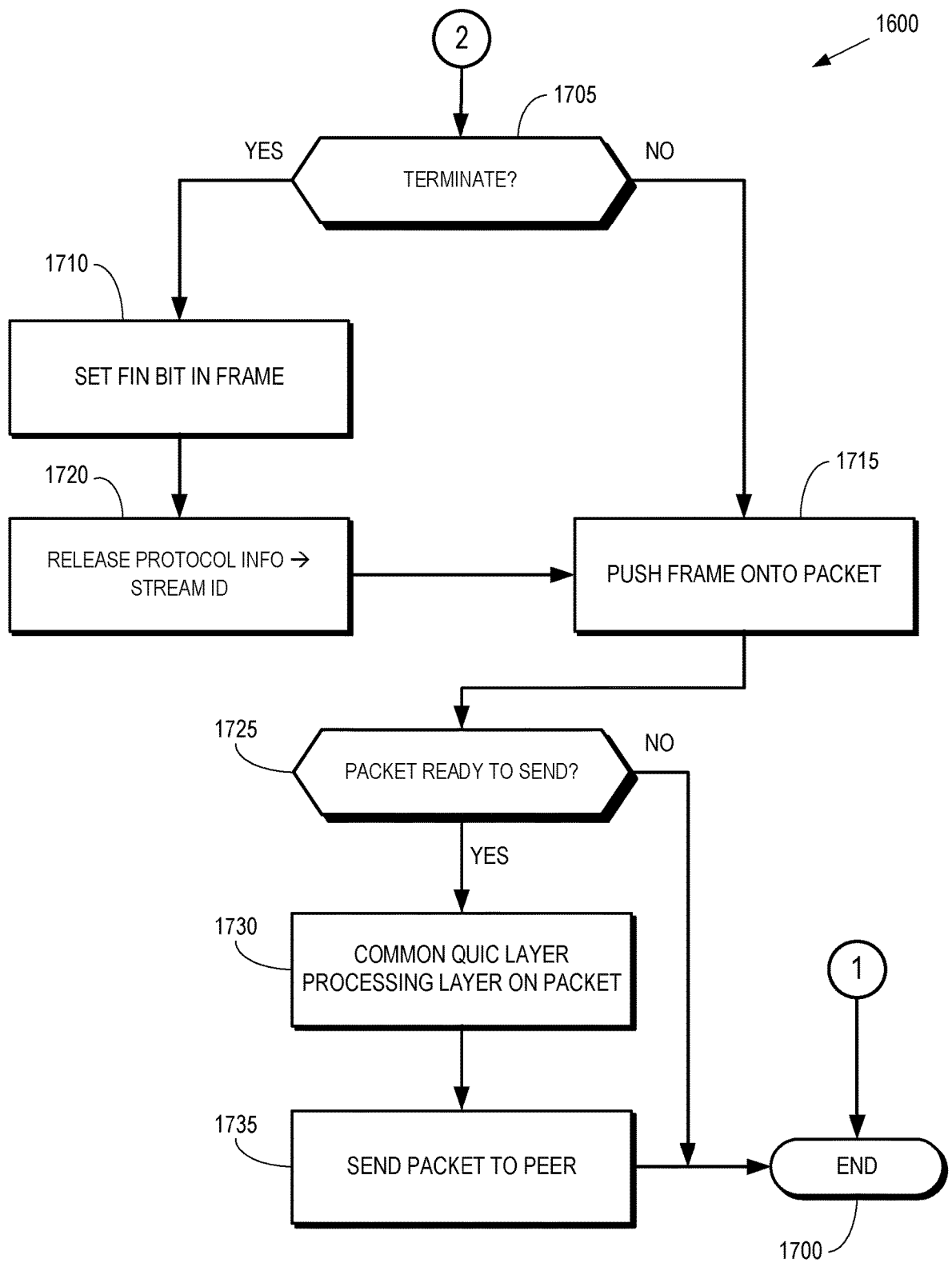
FIG. 17 is a flow diagram of a second portion of the method of transmitting a generic stream frame to tunnel a protocol from a QUIC endpoint to a peer according to some embodiments.

FIG. 17 is a flow diagram of a second portion of the method 1600 of transmitting a generic stream frame to tunnel a protocol from a QUIC endpoint to a peer according to some embodiments. The second portion of the method 1600 connects to the first portion of the method 1600 shown in FIG. 16 via the nodes 1 and 2. The first portion of the method 1600 shown in FIG. 16 flows from the block 1635 to the termination block 1700 via the node 1. The first portion of the method 1600 shown in FIG. 16 also flows from the block 1645 to the decision block 1705 via the node 2.

At decision block 1705, the client determines whether the stream will be terminated after transmitting the current frame. If so, then the method 1600 flows to the block 1710. If the stream is not to be terminated after transmitting the current frame, the method 1600 flows to block 1715.

At block 1710, the client sets the FIN bit in the generic stream frame to indicate that the stream is to be terminated after reception and processing of the current frame. The method 1600 then flows to the block 1720 and the client releases the stream identifier, e.g., according to conventional procedures defined in the QUIC specification. The method 1600 then flows to the block 1715.

At block 1715, the client pushes the generic stream frame onto the QUIC packet and then the method 1600 flows to the decision block 1725. At the decision block 1725, the client determines whether the QUIC packet is ready for transmission, e.g., if the QUIC packet has been filled to include more than a threshold amount of information that is considered optimal. If not, the method 1600 flows to the termination block 1700. If the QUIC packet is ready for transmission, the method 1600 flows to the block 1730 and the client performs common processing on the QUIC packet, e.g., as defined by the QUIC specification. The client transmits the QUIC packet to the peer at block 1735 and then the method 1600 flows to the termination block 1700.

An endpoint in a QUIC connection processes each frame in a QUIC packet in response to receiving the QUIC packet from a peer that includes generic stream frames. If the stream for the stream identifier in a generic stream frame is not setup yet, then the receiving peer sets up the stream with the stream identifier and marks the stream identifier to be owned by the peer (so only the peer can terminate the stream). Additionally, the layer type and protocol identifier in the generic stream frame is associated with the stream identifier as its user protocol. If the stream already exists, then the receiving peer verifies that the layer type and the protocol identifier in the generic stream frame are consistent with the user protocol of the stream. Then, the receiving peer reads out the stream data from the frame and hands over to the user protocol.

Figure 18:
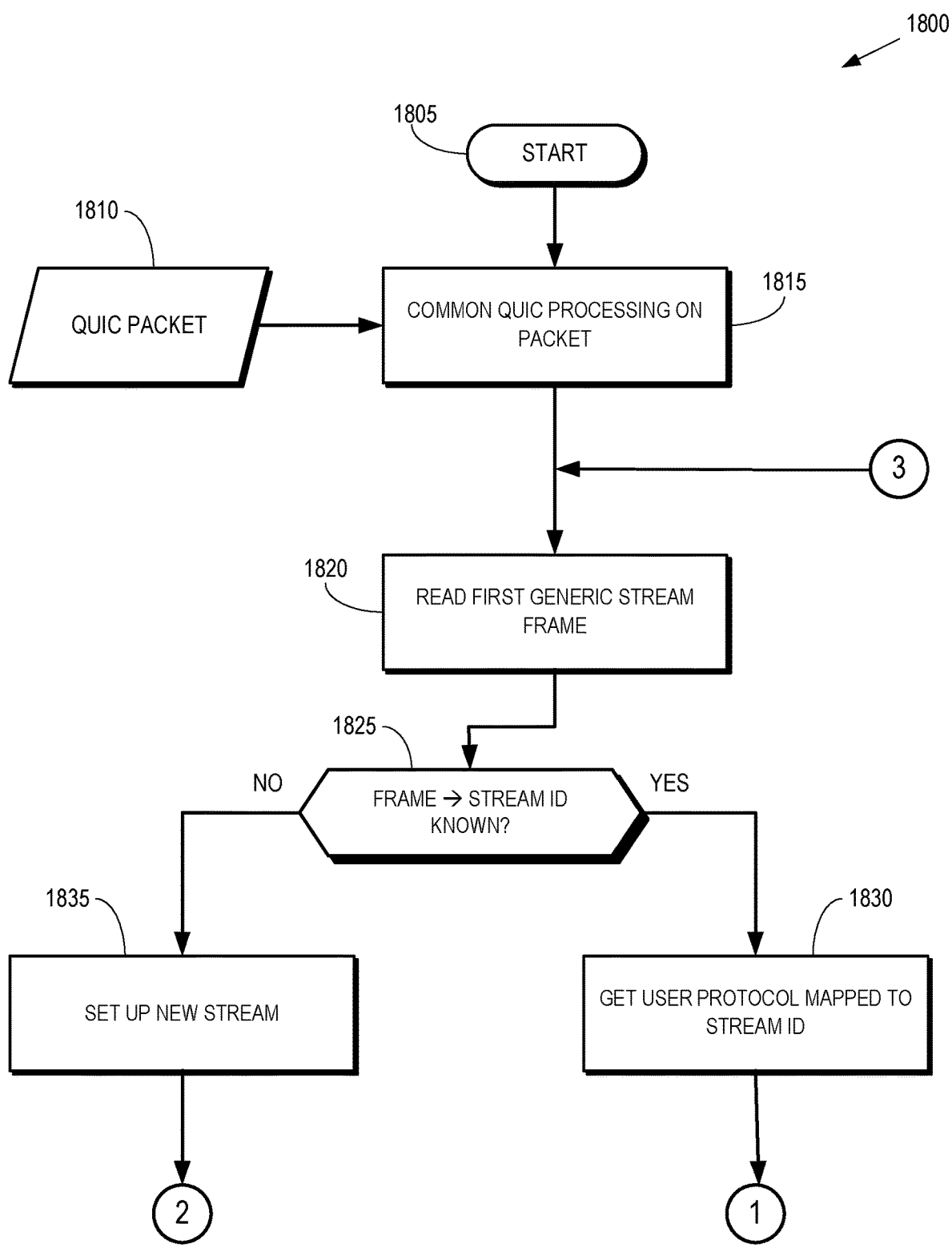
FIG. 18 is a flow diagram of a first portion of a method of receiving a generic stream frame that tunnels a protocol from a QUIC endpoint to a receiving peer according to some embodiments.

FIG. 18 is a flow diagram of a first portion of a method 1800 of receiving a generic stream frame that tunnels a protocol from a QUIC endpoint to a receiving peer according to some embodiments. The method 1800 is implemented in some embodiments of the client 105 and server 110 shown in FIG. 1, and the gateway 1005 and 1010 shown in FIG. 10. In the illustrated embodiment, the server (or client) receives a QUIC packet that includes one or more generic stream frames, such as the QUIC packet that is transmitted by a client according to the method 1600 shown in FIGS. 16 and 17. Although the method 1800 assumes that the packet only includes generic stream frames, some embodiments of packets also include other types of frames in combination with the generic stream frames.

The method 1800 starts at block 1805. The server (or client) receives input 1810 that includes a QUIC packet received from a peer such as a client. At block 1815, the server (or client) performs mandatory processing on the QUIC packet as defined by the QUIC specifications. At block 1820, the server (or client) reads the first generic stream frame in the QUIC packet.

At decision block 1825, the server (or client) determines whether state for the stream identifier exists. If no state exists for the stream identifier, this implies that the current packet is the first packet received on the stream and the state for the stream needs to be created. The method 1800 then flows to block 1830. If there is existing state for the stream identifier, the method 1800 flows to block 1835.

At block 1830, the server (or client) creates the state for the stream identifier, sets the peer as the owner of the stream identifier, and then maps the stream identifier to the user protocol found in the layer type and protocol identifier field of the TLS multiprotocol frame, as discussed herein. The method 1800 then flows to the node 1.

At block 1835, the server (or client) retrieves the user protocol mapped to the stream identifier based on the existing state. The method 1800 then flows to the node 2.

Figure 19:
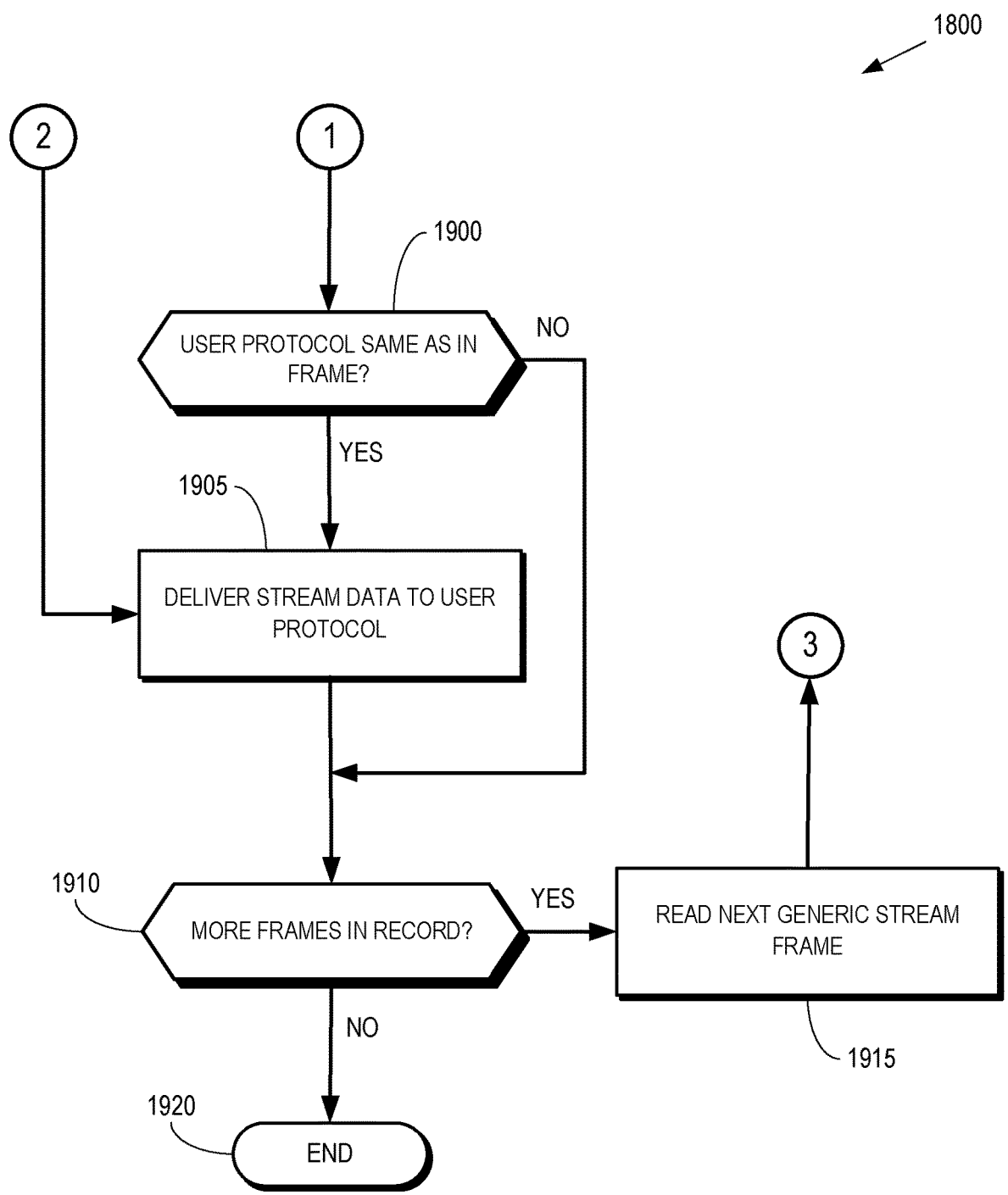
FIG. 19 is a flow diagram of a second portion of the method of receiving a generic stream frame that tunnels a protocol from a QUIC endpoint to a receiving peer according to some embodiments.

FIG. 19 is a flow diagram of a second portion of the method 1800 of receiving a generic stream frame that tunnels a protocol from a QUIC endpoint to a receiving peer according to some embodiments. The second portion of the method 1800 connects to the first portion of the method 1600 shown in FIG. 16 via the nodes 1-3. The first portion of the method 1800 shown in FIG. 18 flows from the block 1830 to the decision block 1900 via the node 1. The first portion of the method 1800 shown in FIG. 18 also flows from the block 1835 to the block 1905 via the node 2.

At decision block 1900, the server determines whether the layer type and protocol identifier in the generic stream frame is the same as the user protocol. If so, the method 1800 flows to the block 1905. If not, the method 1800 flows to the decision block 1910.

At block 1905, the server reads the stream data from the generic stream frame and delivers it to the user protocol. The method 1800 then flows to the decision block 1910.

At decision block 1910, the server determines whether there are more generic stream frames to parse in the QUIC packet. If so, the method 1800 flows to the block 1915 and the server reads the next generic stream frame. The method 1800 then flows to the block 1820 in FIG. 18 via the node 3. If there are no additional generic stream frames to parse in the QUIC packet, the method 1800 flows to the termination block 1920.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
a) hardware-only circuit implementations (such as implementations and only analog and/or digital circuitry) and
b) combinations of hardware circuits and software, such as (as applicable):
  i. a combination of analog and/or digital hardware circuit(s) with software/firmware and
  ii. any portions of a hardware processor(s) with software (including digital signal processor(s), software, and memory(ies) that work together to cause an apparatus, such as a mobile phone or server, to perform various functions) and
c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:
1. A method comprising:
negotiating, at a client with a server, a version of a first protocol that is supported for a connection between the client and the server, wherein the first protocol supports multiplexed connections using a connectionless transport layer protocol;
embedding, at the client, an extension in a cryptographic handshake, wherein the extension comprises a structure that indicates a set of multiple protocols, at a set of multiple layers, supported by the client for communication over the first protocol;

concurrently negotiating, based on the extension, a set of supported protocols supported by the client and the server for communication over the first protocol; and tunneling data from the set of supported protocols over the connection between the client and the server.

2. The method of claim 1, wherein the structure in the extension comprises a list of the set of multiple layers that are supported by the client and, for each supported layer, a list of one or more protocols that are supported by the client at the respective layer.

3. The method of claim 1, wherein concurrently negotiating the set of supported protocols comprises transmitting the cryptographic handshake from the client to the server and receiving, at the client, a cryptographic handshake response including a second extension that indicates a set of protocols supported by the server at a set of multiple layers.

4. The method of claim 1, wherein tunneling the data over the connection comprises creating at least one stream in the connection to tunnel the data between the client and the server from at least one of the supported protocols supported by the client and the server.

5. The method of claim 4, wherein creating the at least one stream in the connection comprises creating the at least one stream in response to the client determining that data is available for transmission according to the at least one of the supported protocols supported by the client and the server.

6. The method of claim 4, further comprising:
creating at least one stream frame comprising the data, a first field having a value indicating a layer type, and a second field having a value indicating a protocol type.

7. The method of claim 6, further comprising:
pushing the at least one stream frame onto a packet; and transmitting the packet toward the server.

8. The method of claim 7, wherein transmitting the packet comprises transmitting the packet with at least one stream frame in a datagram mode or transmitting the packet with at least one stream frame in a stream mode as a byte stream via at least one intermediate layer between a first layer and a protocol layer indicated by the protocol type.

9. A method comprising:
negotiating, at a server with a client, a version of a first protocol that is supported for a connection between the client and the server, wherein the first protocol supports multiplexed connections using a connectionless transport layer protocol;
receiving, at the server, a cryptographic handshake comprising an extension that comprises a structure that indicates a set of multiple protocols, at a set of multiple layers, supported by the client for communication over the first protocol;
concurrently negotiating, based on the extension, a set of supported protocols supported by the client and the server for communication over the first protocol; and
receiving data tunneled from the set of supported protocols over the connection between the client and the server.

10. The method of claim 9, wherein the structure in the extension comprises a list of the set of multiple layers that are supported by the client and, for each supported layer, a list of one or more protocols that are supported by the client at the respective layer.

11. The method of claim 9, wherein concurrently negotiating the set of supported protocols comprises receiving the cryptographic handshake from the client and transmitting, from the server, a cryptographic handshake response including a second extension that indicates a set of protocols supported by the server at a set of multiple layers.

12. The method of claim 11, wherein concurrently negotiating the set of supported protocols comprises resetting, in the extension, at least one protocol of at least one layer not supported by the server.

13. The method of claim 9, wherein receiving the data tunneled over the connection comprises creating at least one stream in the connection to tunnel the data between the client and the server from at least one of the supported protocols supported by the client and the server.

14. The method of claim 13, further comprising:
receiving, at the server, a packet from the client via the at least one stream in the connection;
determining, at the server, at least one stream identifier associated with the at least one stream.

15. The method of claim 14, further comprising:
extracting at least one stream frame from the packet, the at least one stream frame comprising the data, a first field having a value indicating a layer type, and a second field having a value indicating a protocol type.

16. The method of claim 14, further comprising:
verifying that the layer type and the protocol type indicated in the at least one stream frame are indicative of a protocol in the set of supported protocols supported by the client and the server; and
in response to the verification, providing the data from the at least one stream frame to a user protocol indicated by the protocol type.

17. The method of claim 16, wherein receiving the packet comprises receiving the packet as a single stream frame in a datagram mode or receiving the packet in a stream mode as a byte stream via at least one intermediate layer between a first layer and a protocol layer indicated by the protocol type.

18. An apparatus comprising:
at least one processor; and
at least one memory including computer program code;
wherein the at least one memory and the computer program code are configured to, with the at least one processor, cause the apparatus at least to perform:
negotiating, at a client with a server, a version of a first protocol that is supported for a connection between the client and the server, wherein the first protocol supports multiplexed connections using a connectionless transport layer protocol;
embedding, at the client, an extension in a cryptographic handshake, wherein the extension comprises a structure that indicates a set of multiple protocols, at a set of multiple layers, supported by the client for communication over the first protocol;
concurrently negotiating, based on the extension, a set of supported protocols supported by the client and the server for communication over the first protocol; and
tunneling data from the set of supported protocols over the connection between the client and the server.

19. An apparatus comprising:
at least one processor; and
at least one memory including computer program code;
wherein the at least one memory and the computer program code are configured to, with the at least one processor, cause the apparatus at least to perform:
negotiating, at a server with a client, a version of a first protocol that is supported for a connection between the client and the server, wherein the first protocol supports multiplexed connections using a connectionless transport layer protocol;

receiving, at the server, a cryptographic handshake comprising an extension that comprises a structure that indicates a set of multiple protocols, at a set of multiple layers, supported by the client for communication over the first protocol;

concurrently negotiating, based on the extension, a set of supported protocols supported by the client and the server for communication over the first protocol; and receiving data tunneled from the set of supported protocols over the connection between the client and the server.

* * * * *